(12) United States Patent
Jerichow et al.

(10) Patent No.: US 8,539,555 B2
(45) Date of Patent: Sep. 17, 2013

(54) METHOD AND APPARATUS FOR AUTHORIZATION-DEPENDENT ACCESS TO MULTIMEDIA CONTENTS, AND A SYSTEM HAVING THE APPARATUS

(75) Inventors: Anja Jerichow, München (DE); Christian Guenther, Neubiberg (DE)

(73) Assignee: Nokia Siemens Networks Oy, Espoo (FI)

( * ) Notice: Subject to any disclaimer, the term of this patent is extended or adjusted under 35 U.S.C. 154(b) by 544 days.

(21) Appl. No.: 12/763,787

(22) Filed: Apr. 20, 2010

(65) Prior Publication Data

US 2010/0275247 A1  Oct. 28, 2010

(30) Foreign Application Priority Data

Apr. 28, 2009 (EP) .................................... 09005900

(51) Int. Cl.
*G06F 7/04* (2006.01)

(52) U.S. Cl.
USPC .......... 726/4; 726/6; 726/20; 725/28; 725/30; 725/32; 725/33; 725/34; 713/168; 709/219; 709/227

(58) Field of Classification Search
USPC ...................... 726/2–4, 27, 6, 20; 725/30–31, 725/28, 34; 380/247–250; 713/155–159, 713/168–186; 705/18, 44; 707/705; 709/219, 709/227; 370/338, 381
See application file for complete search history.

(56) References Cited

U.S. PATENT DOCUMENTS

| | | | |
|---|---|---|---|
| 6,697,944 B1 * | 2/2004 | Jones et al. | 713/168 |
| 7,616,629 B2 * | 11/2009 | Maeda et al. | 370/381 |
| 7,941,500 B2 * | 5/2011 | Won et al. | 709/217 |

(Continued)

FOREIGN PATENT DOCUMENTS

| | | |
|---|---|---|
| CN | 1739109 A | 2/2006 |
| CN | 101128052 A | 2/2008 |
| EP | 2007101 A1 | 12/2008 |

OTHER PUBLICATIONS

Torbjörn Cagenius, et al.; "Evolving the TV experience: Anytime, anywhere, any device," Ericsson Review, vol. 2006, No. 3, 2006, XP002549013, p. 1, col. 1, line 25—p. 1, col. 3, line 28, fig. 1,3, p. 108, col. 3, line 27—p. 110, col. 1, line 10.

(Continued)

*Primary Examiner* — Edan Orgad
*Assistant Examiner* — Fahimeh Mohammadi
(74) *Attorney, Agent, or Firm* — Laurence A. Greenberg; Werner H. Stemer; Ralph E. Locher

(57) ABSTRACT

A method, an apparatus and a system for authorization-dependent access to multimedia contents. A first terminal produces a first request for a multimedia content for an output of the multimedia content via the first terminal. A first authorization information item is used to check that the output of the multimedia content is authorized. The first terminal produces a second request for an output of the multimedia content via a second terminal. A check is carried out to determine whether to output a first security note via the first terminal. The output of the multimedia content takes place via the second terminal if the first security note is not to be output, or an input of a confirming acknowledgement for the first security note is identified by the first terminal.

15 Claims, 10 Drawing Sheets

(56) References Cited

U.S. PATENT DOCUMENTS

| | | | |
|---|---|---|---|
| 8,024,753 B1* | 9/2011 | Kummer et al. | 725/28 |
| 8,392,941 B2* | 3/2013 | Nagai | 725/28 |
| 2002/0165987 A1* | 11/2002 | Arisaka et al. | 709/246 |
| 2002/0166047 A1* | 11/2002 | Kawamoto | 713/169 |
| 2002/0184517 A1 | 12/2002 | Tadayon et al. | |
| 2003/0028622 A1* | 2/2003 | Inoue et al. | 709/219 |
| 2004/0210926 A1* | 10/2004 | Francis et al. | 725/25 |
| 2004/0210928 A1* | 10/2004 | Hamzy et al. | 725/31 |
| 2005/0240960 A1* | 10/2005 | Nagtzaam | 725/28 |
| 2006/0168246 A1* | 7/2006 | Mochizuki et al. | 709/227 |
| 2007/0214473 A1* | 9/2007 | Barton et al. | 725/28 |
| 2008/0045189 A1 | 2/2008 | Kim et al. | |
| 2008/0062940 A1* | 3/2008 | Othmer et al. | 370/338 |
| 2008/0148310 A1* | 6/2008 | Strickland | 725/30 |
| 2008/0154780 A1* | 6/2008 | Soukup et al. | 705/54 |
| 2009/0259711 A1* | 10/2009 | Drieu et al. | 709/201 |
| 2010/0115592 A1* | 5/2010 | Belz et al. | 726/5 |
| 2010/0138903 A1* | 6/2010 | Medvinsky | 726/6 |
| 2011/0138413 A1* | 6/2011 | Hjelm et al. | 725/34 |

OTHER PUBLICATIONS

European Search Report dated Oct. 15, 2009.

* cited by examiner

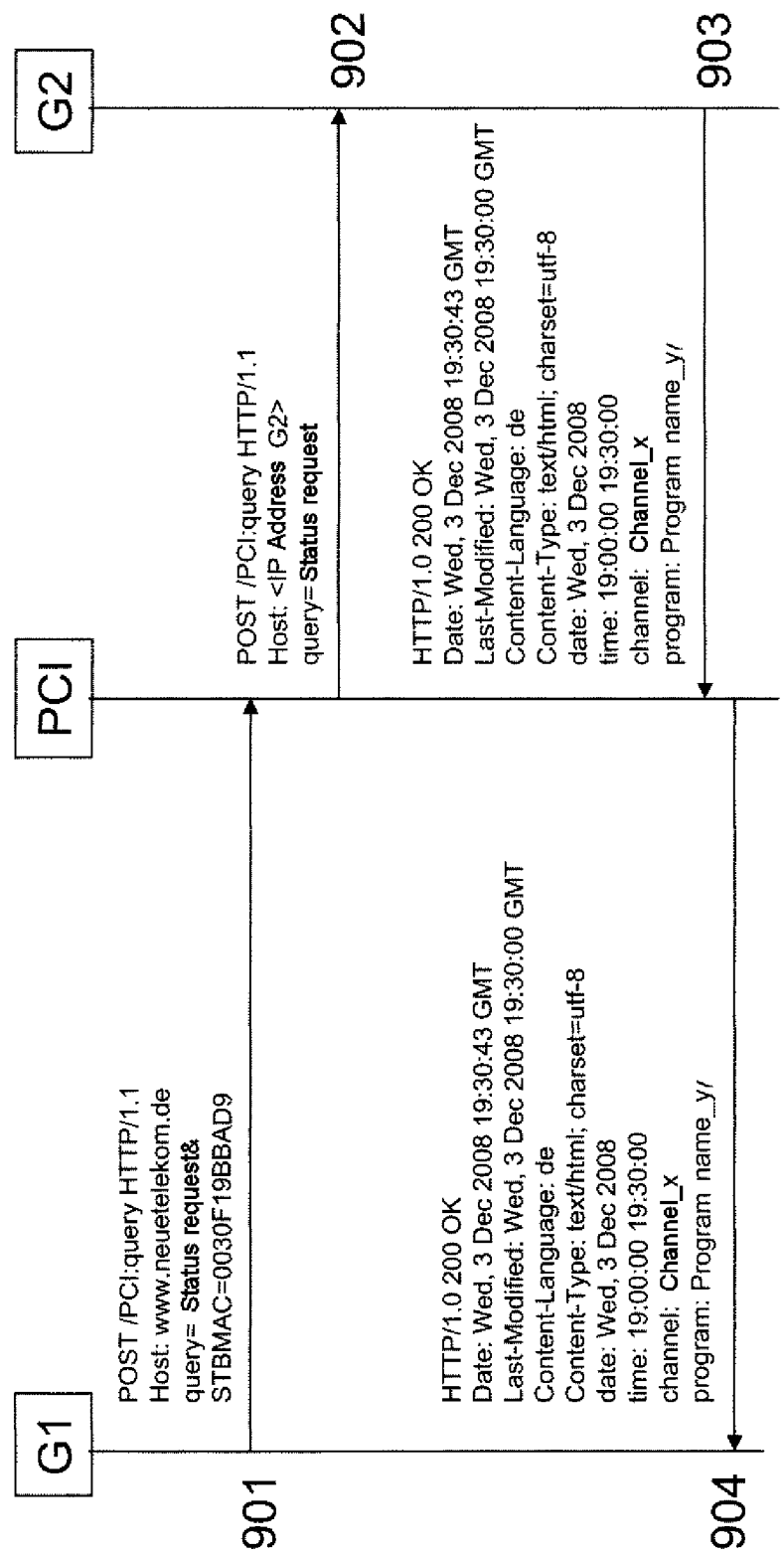

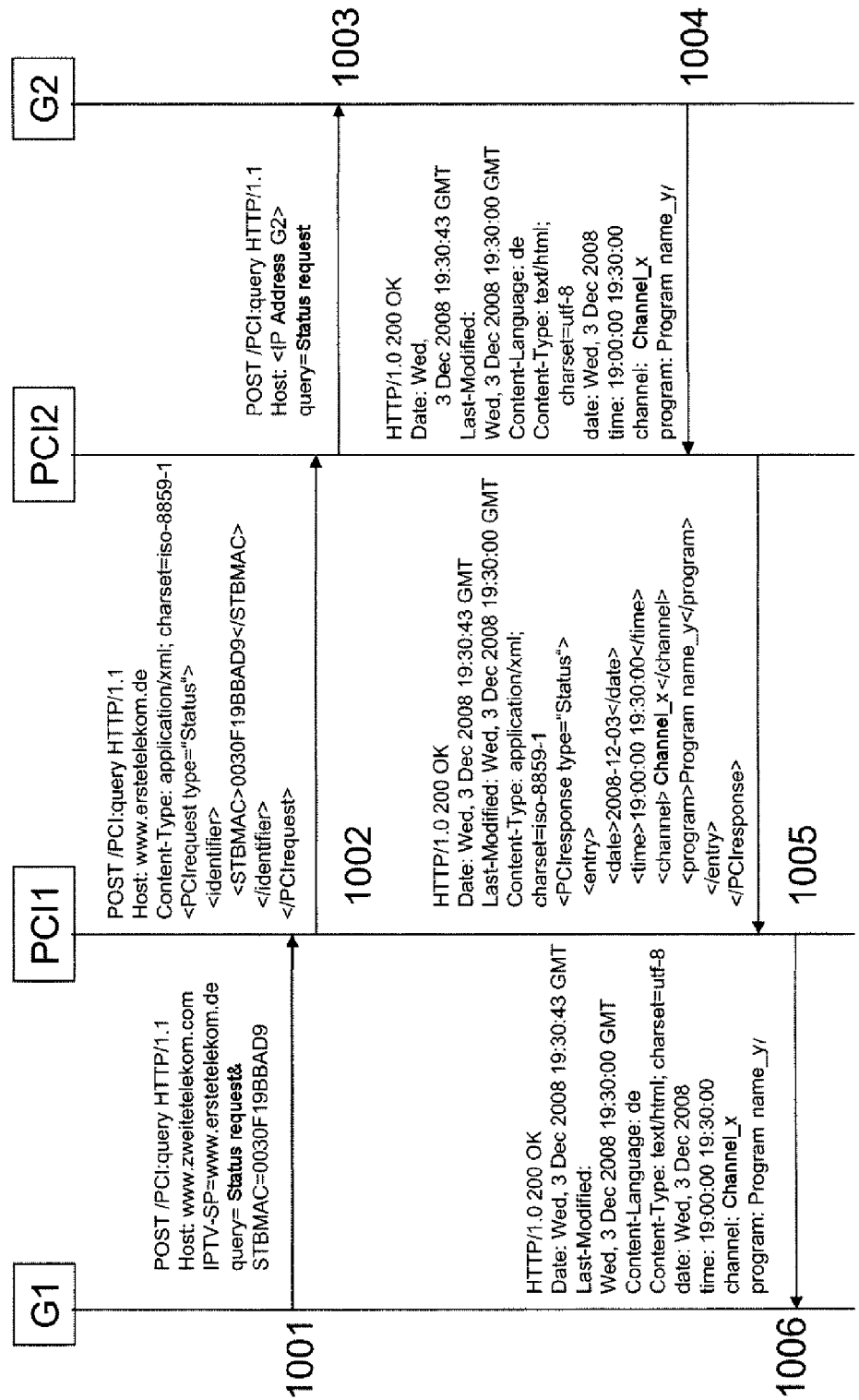

METHOD AND APPARATUS FOR AUTHORIZATION-DEPENDENT ACCESS TO MULTIMEDIA CONTENTS, AND A SYSTEM HAVING THE APPARATUS

CROSS-REFERENCE TO RELATED APPLICATION

This application claims the priority, under 35 U.S.C. §119, of European patent application EP 09 005 900, filed Apr. 28, 2009; the prior application is herewith incorporated by reference in its entirety.

BACKGROUND OF THE INVENTION

Field of the Invention

The invention relates to a method and an apparatus for authorization-dependent access to multimedia contents, and to a system having the apparatus.

Television and broadcast-radio programs are increasingly being offered via a plurality of distribution paths. By way of example, available programs such as these are provided via a terrestrial antenna signal, or else via cable networks, satellite systems, the Internet and communication networks, such as, in particular, mobile radio networks. These novel distribution paths are used to support more general multimedia services which, in addition to television and audio programs, may also include, for example, video on demand, audio on demand, games, texts, images, data and Internet access.

For example, in the case of IPTV (Internet Protocol Television), broadband applications such as television programs and films are transmitted digitally by a digital data network. The Internet protocol (IP), on which the Internet is also based, is used for this purpose. In the case of IPTV, a telecommunications provider typically provides a range of programs of defined quality via a broadband network to a specific user group, or to subscribers. In general, for technical reasons, IPTV requires a suitable subscriber terminal, licensed by the IPTV provider. The terminal receives data streams via an Internet link, for example a DSL-based link, splits these data streams into sub-streams (audio, video, data etc.), decodes them and in general supplies an image and audio signal to an integrated or external video-audio output unit. In particular, by way of example, set-top boxes (STB), televisions (TV), personal computers (PC) and mobile radios are available as terminals. In order to provide the multimedia services which are relevant to a respective IPTV offer, the provider provides, inter alia, components for control, load distribution and access monitoring, for feeding television programs (TV headend) into the broadband network, for providing video/audio contents on demand (VoD server), for recording of contents (PVRs), for transmission by streaming and/or download, and for encryption of the contents to be transmitted.

In addition to IPTV network solutions based on a landline network, there are, in particular, network solutions suitable for mobile radio networks, for mobile television and which, for example, are typically offered by mobile radio network operators. Network solutions such as these require similar components at the provider end to those already mentioned above, but, because of the different technology, use different concepts and standards. In particular, for example, the coding of the payload signals and the functionality of the terminals (for example display size, local processing power, local memory, transmission bandwidth) differ from the IPTV solutions used for a landline network.

Because of the number of distribution paths and network solutions for provision of multimedia contents, it is possible for a user or subscriber to access a content of interest to him, for example a movie provided on demand or a television program, at home, at the workplace, at acquaintances, or in particular while traveling. For this purpose, the user or subscriber can operate different terminals, and/or can use different network solutions.

A movie provided on demand or a television program can be classified, for example, in terms of its suitability for children and adolescents. In particular, a multimedia content that is provided may be classified, for example, as for general release, as being suitable from a certain age, or as not for the young. Other classifications can likewise exist. In addition, program channels and program categories may be used for classification. Said network solutions can support different types of parent access control to classified contents. Such access control generally comprises at least the capability for parents to define access authorizations and the capability to verify adequate access authorization to classified contents by the children on demand, or access to classified contents, in which case adequate access authorization can in general be verified by inputting a password. In addition to these basic functions of access control by parents, said network solutions can likewise offer various further service features relating to access control by parents. In particular, program information systems such as Electronic Program Guide (EPG) and Electronic Service Guide (ESG) can be adapted for this purpose. There are also various requirements, from national laws and state-specific regulations, relating to access control by parents to said network solutions. Furthermore, various standardizations exist (OMA, DVB), which each define how a user of a network solution is to be informed of classified contents and can obtain information relating to this. However, said network solutions for provision of multimedia contents may also have specific functionality, differing from such standards, with regard to access control by parents.

In this case, it is disadvantageous that functions relating to access control by parents are restricted to one network solution and are not available over a plurality of different network solutions and independently of the equipment. For example, if a family with children has not only a number of television sets and/or set-top boxes at home, linked via DSL, cable or some other landline network access, but also mobile terminals for one of said network solutions for the children, then both the parents and the children have to manage/control at least two different solutions for access control by the parents. If a content, in particular a television program, a video provided on demand, a television channel or a program category is offered both via the landline network solution and via the mobile network solution, it may need to be blocked or cleared separately by the parents in both solutions in order to provide multimedia contents for access by the children. In particular, a change made to a classified content for the purposes of a single access, between a terminal for the mobile radio solution and a terminal for the landline network solution, requires specific authorization verification for the respective network solution, for continued access to the classified content. In addition, access by parents to the status of a landline network solution terminal used by the children is impossible via a mobile radio network solution terminal and, vice versa, access by parents to the status of a mobile radio network solution terminal used by the children is not possible via a landline network solution terminal.

SUMMARY OF THE INVENTION

It is accordingly an object of the invention to provide a method, an apparatus, and a system which overcome the above-mentioned disadvantages of the heretofore-known devices and methods of this general type and which provides for improved access control with respect to use in more than one network solution for provision of multimedia contents, resulting in availability independently of the equipment, simple functionality and simple controllability of the access control.

With the foregoing and other objects in view there is provided, in accordance with the invention, a method of enabling authorization-dependent access to multimedia contents, the method which comprises:

at a first terminal, providing a first request for a multimedia content for an output of the multimedia content via the first terminal;

using a first authorization information item to check whether or not the output of the multimedia content is authorized;

at the first terminal, providing a second request for an output of the multimedia content via a second terminal;

checking whether or not a first security note is to be output via the first terminal; and outputting the multimedia content via the second terminal if the first security note is not to be output, or if an input of a confirming acknowledgement for the first security note is identified by the first terminal.

In other words, the objects of the invention are achieved with a method for authorization-dependent access to multimedia contents. The method comprises the following steps:

a first terminal produces a first request for a multimedia content for an output of the multimedia content via the first terminal;

a first authorization information item is used to check that the output of the multimedia content is authorized;

which the first terminal produces a second request for an output of the multimedia content via a second terminal;

a check is carried out to determine whether to output a first security note via the first terminal;

the output of the multimedia content takes place via the second terminal if the first security note is not to be output, or an input of a confirming acknowledgement for the first security note is identified by the first terminal.

This is advantageously associated with the concept that an authorization verification controlled via the first terminal for access to the multimedia content need not be repeated in order to continue the output of the multimedia content via the second terminal. In particular, there is no need to once again input the first authorization information item via the first or the second terminal or to additionally input a further authorization information item via the second terminal. Thus, for example, if one of the parents has been following a classified television program via his mobile terminal before arriving at the dwelling used by the family, then, on reaching the home television which, for example, is connected via a landline network, he can continue to follow the classified television program via the television without further verification of its access authorization, following a simple control action on his mobile terminal. With this control action, he confirms that the output of the classified television program or, more generally, of a classified multimedia content, via the television is permissible and desired. If no adequate first authorization information item for access to the classified multimedia content, in particular the output of the multimedia content, is found by the first terminal or by the interaction of the first terminal with a server for a network solution, covering the first terminal, for provision of multimedia contents, then the process collapses, and is not continued any further.

Furthermore, it is advantageous that a first security note can be output by the first terminal. The user and/or the operator of the network solution for provision of multimedia contents can thus ensure, for example by configuration of the first terminal, that an incorrect control input on the first terminal does not lead to the classified multimedia content being undesirably output via the second terminal.

The first security note can likewise be generated in the course of a configuration process or setting of the second terminal, indirect configuration of the first terminal by configuration or setting a first network solution for provision of multimedia contents for the first terminal, indirect configuration of the second terminal by configuration or setting of a second network solution for provision of multimedia contents for the second terminal, or the interaction of a plurality of said configurations and settings. In this case, the configurations or settings of said network solutions may be of global character for the respective network solution or else state-specific, region-specific, subscriber-profile-specific, subscriber-group-specific, specific for a family or subscriber-specific. This is associated with the advantage that the strict requirements for access control by parents can be complied with and, for example, the output of the classified multimedia content via the second terminal can reliably be prevented when the second terminal is, for example, in use, when the access authorization of the user of the second terminal is not adequate for the output of the classified multimedia content or when the output of the classified multimedia content requires previous agreement by parents.

Furthermore, the check as to whether the first security note should be output can be carried out as a function of the first terminal, as a function of the second terminal or as a function of the first terminal and the second terminal. The result of the check as to whether the first security note should be output can thus be dependent on a state, a functionality, a setting or configuration of the first terminal and/or on a state, a functionality, a setting or a configuration of the second terminal.

By way of example, the multimedia content may be a television program, a video on demand, an audio radio broadcast, an audio on demand, an electronic game or an electronic book. By way of example, a multimedia content may likewise comprise a multimedia content which can be called up on demand by a subscriber, a movie, a video clip, a video message, a voice message, a recording of a television or audio radio program, a complete or partial recording of a television or audio radio program, an audio content, an Internet page, a walled garden site, image material, audio material, a stationary image, a moving image, a live signal of a television or audio radio program, a link to one of the above contents, any desired combination of the above contents, or any desired combination of the above contents with further contents.

Access to the multimedia content may comprise the output of the multimedia content or of a part, in particular of a time period, of a scene, of an image, of an image sequence, of audio information, of text information, of metadata information, address information or other information associated with the multimedia content. However, access may likewise in particular be storage of information associated with the multimedia content or a change to information associated with the multimedia content. In particular, this may be voting, marking, a bookmark, a comment, complete or partial storage, processing of image, audio and/or text information in the multimedia content, copying, dissemination or passing on the multimedia content or of parts thereof to further users.

The method can be carried out completely on the first and the second terminal. The first and/or the second terminal may likewise interact with servers of the respective network solutions in order to provide multimedia contents. For example, a server of an IPTV solution, of a hybrid television solution based on a terrestrial antenna or satellite antenna with a backchannel from the terminal to the service provider, of a landline network television solution based on DSL or cable connection, or of a mobile radio television solution may be involved in carrying out the method. The method can likewise partially be implemented at a network gateway between two of the abovementioned television solutions, in particular for example at a network gateway between an IPTV solution of the landline network and a mobile radio television solution. The method can also be carried out in a television solution which is based only on terminals, for example a peer-to-peer television solution.

The production of the first request for the multimedia content, the check of the first authorization information item, the production of the second request and the identification of the confirming acknowledgement for the first security note by the first terminal can in each case result from simple control actions on the first terminal.

In particular, this may be an input of a request for the multimedia content, an input of an access authorization, an input of a request to output the multimedia content via the second terminal or the input of a confirming acknowledgement, for example pushing a predetermined input button on the first terminal.

The first authorization information item can typically comprise a secret number (PIN) or access password. Depending on the functionality of the first terminal, the first authorization information item may, however, also comprise information items of other mechanisms of user identification, for example information items for speaker recognition, information items for visual personal identification or a combination of information items for the user identification mechanisms mentioned above, or other such mechanisms.

The check carried out on the basis of the first authorization information item as to whether the output of the multimedia content is authorized can be carried out locally in the first terminal. For this purpose, the first terminal may have locally stored information items or can call up information items as required from a server or network element of the first network solution in order to provide multimedia contents which allow it, for example, to use the first authorization information item to deduce the access rights associated with the first authorization information item, and to compare these with the rating of the multimedia content. This allows the first terminal to locally assess the authorization required to output the multimedia content for permissibility with respect to the first authorization information item. However, this assessment can likewise also be carried out on a network element or server of the first network solution for providing multimedia contents, wherein the first terminal for this purpose produces the first request, from which the multimedia content and/or its rating are/is evident, and the first authorization information item.

By way of example, the access control can advantageously be used for access control by parents within a family. Access control within a predetermined user group or subscriber group is likewise possible. A user group or subscriber group such as this does not necessarily have any reference to a family.

One development is that the first authorization information item is a master authorization information item or an input of a further authorization information item is identified by the first terminal, wherein the further authorization information item is a master authorization information item.

If the first authorization information item is a master authorization information item, then, for example, functions for access control by parents are advantageously automatically additionally available for access authorization to classified multimedia contents. If the first authorization information item is not a master authorization information item then, in addition, a further authorization information item can be identified and/or provided by the first terminal, via an input on the first terminal, with the further authorization information item being a master authorization information item. By way of example, functions for access control by parents are likewise additionally available as a result of the availability of the further authorization information item. In particular, these functions may comprise the functions for access control by parents to the first network solution for provision of multimedia contents for the first terminal. In addition, functions for access control by parents to the second network solution can be made available in order to provide multimedia contents for the second terminal by intercommunication with network elements in the second network solution in order to provide multimedia contents for the second terminal and/or by intercommunication with the second terminal. In particular, the master authorization information item may allow checking of configuration data and/or settings of the access control by parents for the second network solution, for providing multimedia data for the second terminal, by the first terminal. This is associated with the advantage that one parent may, for example, output the settings of the access control by parents in both network solutions for provision of multimedia contents, via the first terminal. There is no longer any need to additionally use the second terminal for this purpose. Configuration data and/or settings relating to access control by parents may comprise the classified multimedia contents which are barred or allowed for the children, for example television programs, program channels, program categories, the access authorizations to classified multimedia contents associated with the users, and/or the authorization information items.

A further development is for the master authorization information item to have a control authorization for the second terminal by the first terminal.

In particular, the master authorization information item may allow the first terminal to be used to input configuration data and/or settings for access control by parents for the second network solution for provision of multimedia data for the second terminal. This is associated with the advantage that one parent, for example, can use the first terminal to input the settings for access control by parents in both network solutions for provision of multimedia contents. Direct control of the second terminal, for example the termination of the output of a multimedia content on the second terminal, is also possible via the first terminal, or else the first terminal can be used to switch the second terminal off or on. There is no need to additionally use the second terminal or a further terminal for the second network solution for provision of multimedia contents in each case for this purpose.

In accordance with another feature of the invention, a second status information item may be output via the first terminal, wherein the second status information item relates to the second terminal.

By way of example, this allows the first terminal to use the master authorization information item to check whether the second terminal is currently active, and what multimedia contents it is currently accessing. A current user of the second terminal or a current user identification and/or the respective access authorization of the user of the second terminal can likewise be output via the first terminal. In addition, corresponding functions can be output via the first terminal for a point in time in the past or for a time interval in the past. In this case, it is once again advantageous that one parent can conveniently use the first terminal for the first network solution for the provision of multimedia contents to obtain the second status information item, which relates to the second terminal for the second network solution for provision of multimedia contents. There is no need in each case to additionally use the second terminal or a further terminal for the second network solution for provision of multimedia contents for this purpose.

In accordance with an added feature of the invention, the second status information item may relate to at least one further multimedia content which has been or is being output via the second terminal.

In accordance with a further feature of the invention, the second status information item may be output as part of the first security note.

This has the advantage that the user of the first terminal can automatically obtain status information relating to the state of the second terminal at the same time as the first security note, and without any further control action.

In accordance with a further feature of the invention, a second status information item is also output by the first terminal, separately from the first security note, after a third request.

This has the advantage that the user of the first terminal can obtain the second status information item even when the first security note has not yet been produced, is not being produced, or has already been produced. This advantageously allows the user of the first terminal to access the second status information item at any time, independently of the first security note.

In accordance with a further development of the invention, the second status information item comprises at least one of the following information items:
    title of the further multimedia content,
    category of the further multimedia content,
    TV channel of the further multimedia content,
    classification of the further multimedia content.

This has the advantage of detailed information for the user of the first terminal about the nature of the multimedia content which has already been output, or is being output, via the second terminal.

A further development is for a further request to be made by the first terminal for updating of rights linked to a third authorization information item and/or of the third authorization information item, wherein the third authorization information item authorizes the output of a second further multimedia content via the second terminal.

This has the advantage that, for example, one parent can make use of the master authorization information item via the first terminal to update authorization information which is relevant for multimedia access via the second terminal and/or the access rights associated with the authorization information.

A further development is for the updating of the rights associated with the third authorization information item and/or the third authorization information item to be stored in the second terminal and/or a smartcard of the second terminal.

This is associated with the advantage of local storage, which is quickly available for the second terminal and is not volatile, of the updating of the rights associated with the third authorization information item, and/or the third authorization information item. It is likewise advantageous that no local control functions are required for this purpose on the second terminal and/or actions on the smartcard of the second terminal.

In another development, the output of the second further multimedia content via the second terminal is checked with respect to updating of the rights associated with the third authorization information item and/or of the third authorization information item, and the output by the second terminal is suppressed if the updating results in lack of authorization for access to the second further multimedia content, in particular the lack of authorization to output the second further multimedia content.

This is associated with the advantage that the updating is immediately effective.

In accordance with again an additional feature of the invention, the multimedia content is output immediately via the first terminal, or the output of the multimedia content is booked.

An output of the multimedia content via the second terminal can thus advantageously be requested for an output of the multimedia content which has already taken place via the first terminal without repeated or renewed input of an authorization information item. However, an output of the multimedia content via the second terminal can likewise also be booked. This is particularly advantageous with respect to simple control and planning of future outputs of multimedia contents when the multimedia content is not yet available, since, for example, it is identical to a future news broadcast. For example, one parent can thus define the output of a classified television program, whose output has not yet taken place, with the aid of the first terminal for automatic output via the second terminal. In this case, the first security note can also be used to ensure that the classified multimedia content cannot be undesirably output to unauthorized users, contrary to the plan.

Another development consists in that a second security note is output via the second terminal if the second terminal is in operation at the point in time of the start of the output of the multimedia content via the second terminal.

This has the advantage that a user of the second terminal knows the reason for the start of the output of the multimedia content via the second terminal.

In accordance with yet another feature of the invention, a third security note is output in response to a rejection of the second request via the first terminal, if the second terminal produces a negative acknowledgement for the second security note.

This has the advantage that a user of the second terminal can also reject the output of the multimedia content via the second terminal. Such rejection is notified to the user of the first terminal, in the form of the third security note. In this case, the third security note is generated on the basis of the negative acknowledgement which is produced by the second terminal. The negative acknowledgement in response to the second security note can be produced by the second terminal on the basis of an operator input on the second terminal.

A further embodiment is for the output of the multimedia content via the second terminal to be requested immediately with availability of the multimedia content or for a predetermined point in time.

This is associated with the advantage that an output of the multimedia content which, for example, has already taken place via the first terminal can be continued virtually immediately, except for the confirming acknowledgement which may be necessary, and without any further control actions, or can be continued at a defined later point in time, via the second terminal. The options for immediate output of the multimedia content with the availability of the multimedia content and/or the option of later output of the multimedia content at the predetermined point in time may in this case be selected by user inputs on the first terminal. This user can enter both the desired option and the predetermined point in time on the first terminal. This also results in the advantage that the multimedia content can be output as quickly as possible when it is available.

In another development, the second terminal is switched to an active operating state if it is in an inactive operating state before the point in time of the start of the output of the multimedia content via the second terminal.

This is associated with the advantage that no control actions are required to switch on the second terminal and that undesirable waiting times are avoided, particularly when a request is made for an immediate output of the multimedia content via the second terminal.

In yet again another development of the invention, the multimedia content is still output via the first terminal after the point in time of the start of the output of the multimedia content via the second terminal.

This has the advantage that the output of the multimedia content via the first terminal is not interrupted so early that components of the multimedia content are not output via the first terminal which are not output via the second terminal because of the delay time or because of the two network solutions involved in providing the multimedia content. This likewise results in the advantage that the multimedia content C is still output via the first and the second terminals.

According to a further refinement of the invention, the first terminal and the second terminal are associated with one another.

This has the advantage that an existing association of the first and second terminals means that there is no need for a check which would otherwise be necessary of the data for identification of the second terminal in the course of the second request. If the association between the first and second terminals is already known at the point in time when the second request is made, then this has the advantage that necessary access data, for example the address data of the second terminal, can be stored in a quickly accessible form, thus making it possible to quickly output the multimedia content via the second terminal.

In accordance with a further development:

the first terminal is associated with a first service provider network and is identified with the aid of a first identification information item;

the second terminal is associated with a second service provider network and is identified with the aid of a second identification information item; and the first terminal and the second terminal are associated with one another by association of the second identification information item with the first terminal.

This is associated with the advantage that association of the first and second terminals by means of already existing unique identifications of the first and second terminals can be used for simple terminal allocation within the first and second service provider networks. In particular, for example, the MAC address can be used for terminal identification in a network solution based on IPTV, in order to provide multimedia contents. The unique appliance identifications IMSI, MSISDN can be used in a corresponding manner for provision of multimedia contents in a network solution based on mobile radio television.

A further development is for the first security note to be output via the first terminal if no input of a second authorization information item has been identified by the second terminal, wherein the second authorization information item authorizes the output of the multimedia content This has the advantage that the first security note can be avoided in the situation in which the user of the second terminal in any case has the authorization for access to the multimedia content.

In accordance with a concomitant feature of the invention, at least one authorization control server is provided, via which communication is passed between the first terminal and the second terminal.

This is associated with the implementation advantage of the bundling of all the functions required, for example, for the functions of access control by parents, in the at least one authorization control server. This can advantageously be implemented on dedicated network elements in the respective network solutions for provision of multimedia contents. Alternatively or additionally, a distributed implementation on the terminals is likewise possible.

Other features which are considered as characteristic for the invention are set forth in the appended claims.

Although the invention is illustrated and described herein as embodied in a method and apparatus for authorization-dependent access to multimedia contents, and a system having the apparatus, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE SEVERAL VIEWS OF THE DRAWING

FIG. 9 shows a message flow, based on the HTTP protocol, for a status check via an authorization control server;

FIG. 10 shows a message flow, based on the HTTP protocol, for a status check via two authorization control servers.

DETAILED DESCRIPTION OF THE INVENTION

Figure 1:
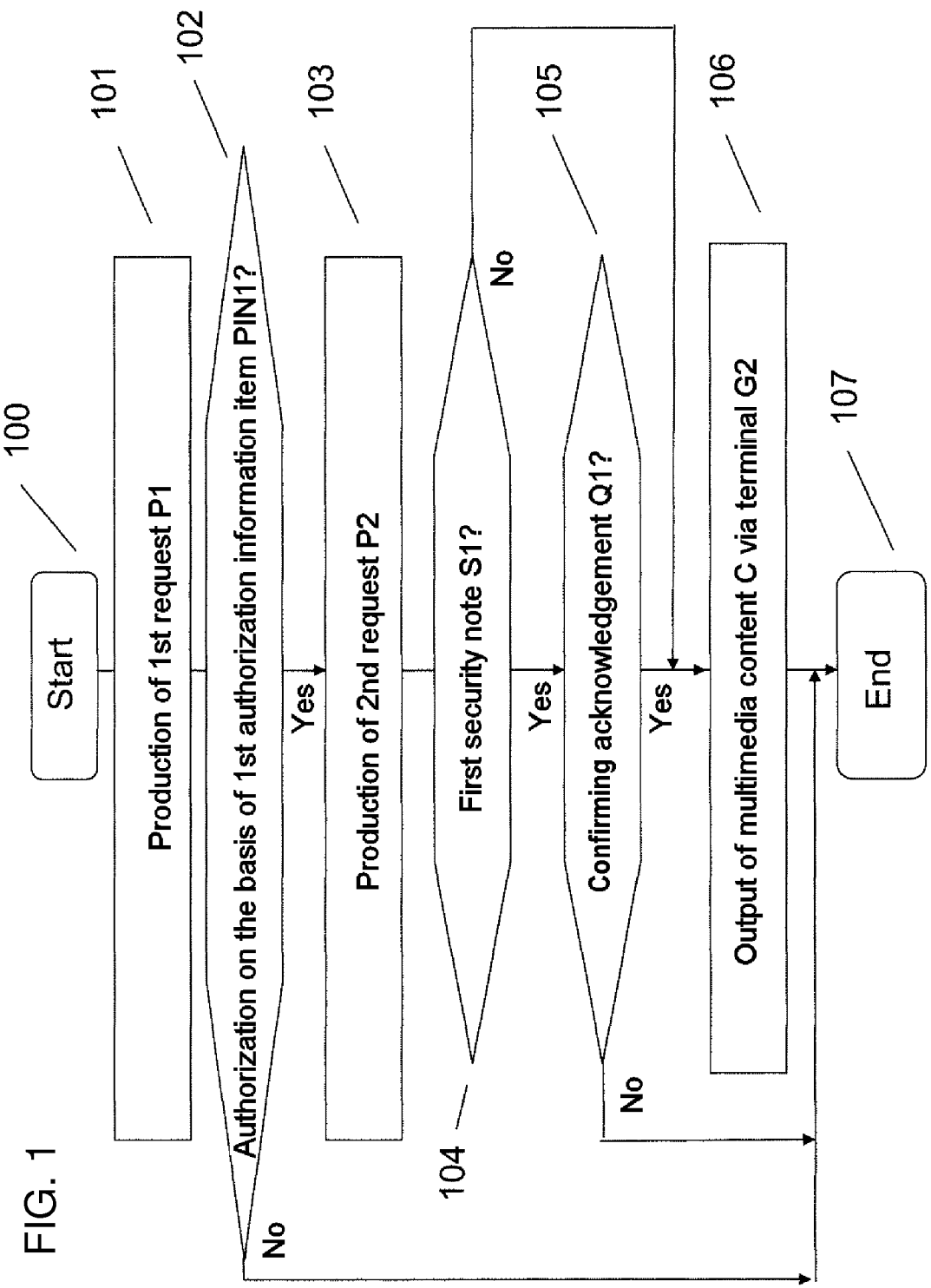
FIG. 1 shows a flowchart of the primarily important method steps according to the invention.

Referring now to the figures of the drawing in detail and first, particularly, to FIG. 1 thereof, there is shown a flowchart of the major method steps to be carried out. After a start (step 100), a first request P1 for a multimedia content C is produced by a first terminal (step 101) in order to output the multimedia content C via the first terminal. The output of the multimedia content C can in this case take place via an output unit which is integrated in the first terminal, for example via the display of a mobile telephone. The output can likewise take place via an output unit which is not integrated in the first terminal, for example a television set connected to a set-top box.

If the multimedia content C is classified, that is to say it can be accessed and/or output only with an access authorization which is minimum required, then the user of the first terminal is requested by the first terminal to enter his personal identification number or a password and/or is requested for further inputs which are used to determine the user identity. The input information items which are used for user identification are part of a first authorization information item PIN1. The inputting of data which is used for user identification can be avoided if this has already been done during the course of use of the first terminal, and the data which is used for user identification has, for example, been stored in the first terminal. In addition, the first authorization information item PIN1 may also comprise further data items which are used to check access authorization, for example information about the first terminal, an identification of the first terminal, or address information for the first terminal. The first authorization information item PIN1 is checked in a step 102 to confirm that it authorizes the user of the first terminal to output the multimedia content C desired in accordance with the first request P1. For this purpose, access rights associated with the first authorization information item PIN1 are compared with the access rights which are required as a minimum in accordance with the rating or classification of the multimedia content C in order to output the multimedia content. If the access rights associated with the first authorization information item PIN1 are not sufficient to output the multimedia content C, or no valid first authorization information item PIN1 is available, then the method ends in a step 107, without outputting the multimedia content C.

After successfully checking that the output of the multimedia content C is authorized, a second request P2 is produced in a step 103, for outputting the multimedia content C via a second terminal G2. The point in time at which the second request P2 is produced may, in particular, be a point in time after a start and before an end of the output of the multimedia content C via the first terminal. The second request may, however, likewise also be produced before the start of the output of the multimedia content C via the first terminal or after the output of the multimedia content C via the first terminal. By way of example, this is possible for a television program which has not started or a film on demand (VoD) which has already been shown.

According to a step 104, the second request P2 can result in a first security note S1 being output by the first terminal. The first security note S1 may be output as a function of the first terminal and/or the second terminal G2. In particular, the state of the first terminal and/or the state of the second terminal G2 may cause the output of the first security note S1. By way of example, the first terminal can be configured such that after the production of the second request P2, and once the preconditions for outputting the multimedia content C via the second terminal G2 have been verified, the first terminal necessarily instructs the multimedia content C to be output, as requested by the second request P2, via the second terminal G2, demanding an input of a confirming acknowledgement Q1 as an essential security measure against incorrect operation. The second terminal G2 can likewise be configured such that, when the first terminal requests the output of the multimedia content C, the essential output of the first security note S1 is demanded via the first terminal in order to preclude undesirable interference with the use of the second terminal G2. Settings and configuration by the network operator for the functionality of the first terminal, of the second terminal G2 and/or of network elements of the solutions involved for provision of multimedia contents can also lead to the first security note S1 being output. The output of the first security note S1 can also be suppressed on the basis of the configuration. Particularly for the situation in which the user of the second terminal G2 has already been identified as being authorized for the output of the multimedia content C at the point in time when the multimedia content C is output, the output of the first security note S1 can also be omitted. If the first security note S1 is not output, then the method continues with a step 106, according to which the multimedia content C is output via the second terminal G2. The multimedia content C may be output via the second terminal G2 immediately or later, depending on the time availability of the multimedia content C and the second request P2.

If the first security note S1 is output, then this can be associated with the explicit request to input the confirming acknowledgement Q1. The confirming acknowledgement Q1 can likewise also be entered without any explicit input request, after the first security note S1 has been output. When the first terminal identifies the input of the confirming acknowledgement Q1 in accordance with step 105 of the method, then the method continues with the step 106, according to which the multimedia content C is output via the second terminal G2. If the input of the confirming acknowledgement Q1 is not identified by the first terminal in accordance with step 105 of the method, for example after a guard time has elapsed or after repeated input requests, then the method ends in step 107 without the multimedia content C being output.

After the multimedia content C has been output via the second terminal G2 in accordance with step 106, the method likewise ends in step 107.

Figure 2:
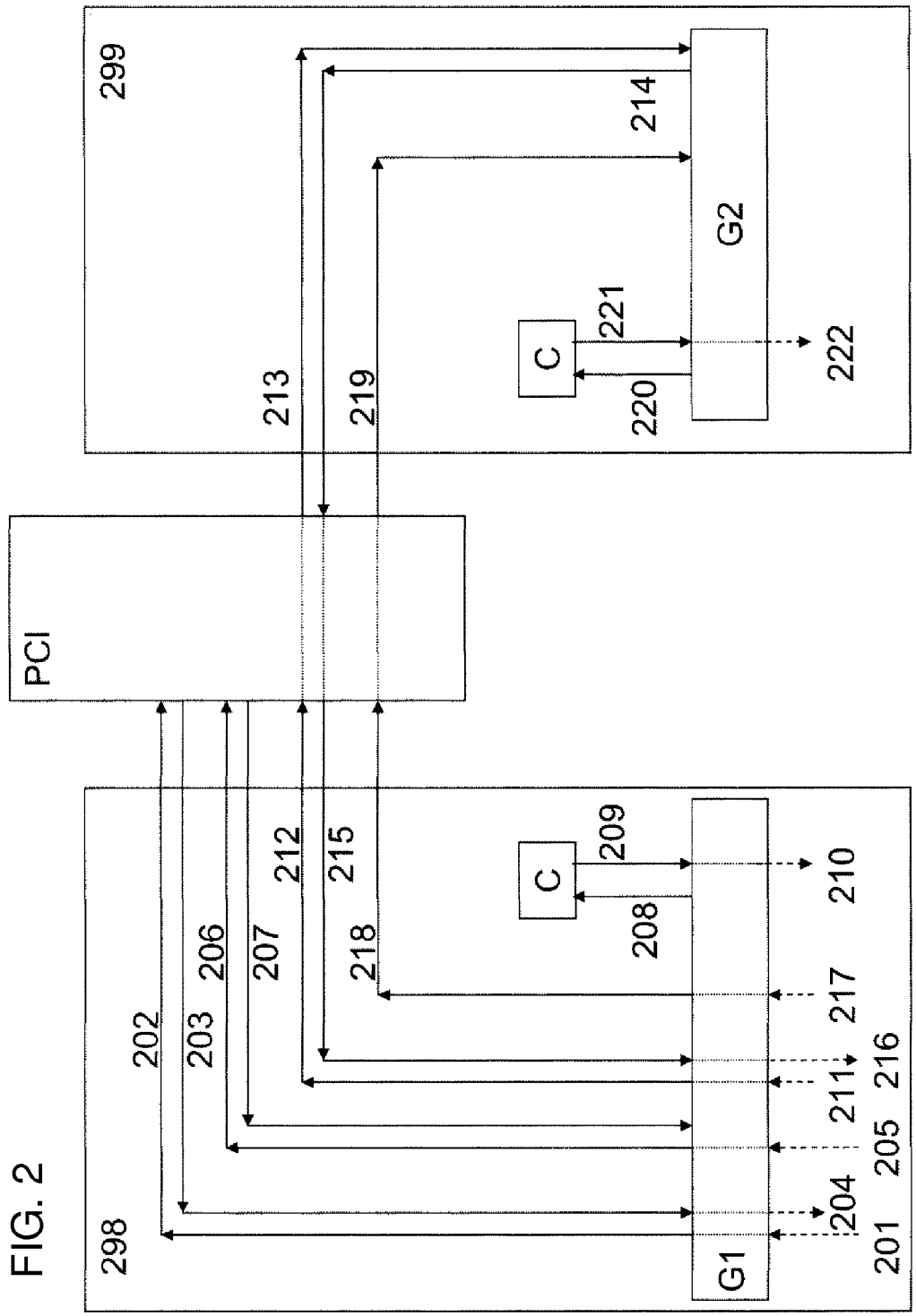
FIG. 2 shows an output of a multimedia content with the involvement of an authorization control server.

FIG. 2 shows a multimedia content C being output with the involvement of an authorization control server PCI. The authorization control server PCI is in this case a central device and allows intercommunication of a first service provider network 298, which provides a first network solution for provision of multimedia contents, for a first terminal G1, and a second service provider network 299, which provides a second network solution for provision of multimedia contents, for a second terminal G2. In particular, the authorization control server PCI allows communication between the first terminal G1 and the second terminal G2. In order to communicate with the authorization control server PCI, the first terminal G1 and the second terminal G2 each have a client functionality for the authorization control server PCI, which can preferably be in the form of software.

Functions of the authorization control server PCI may relate to support for management, covering the first and second service provider networks, of access rights for access control by parents to multimedia contents, and of access authorization information items. By way of example, this makes it possible for the same authorization information items to be available in the first and the second service provider networks. It likewise allows the availability of the same classification of multimedia contents which are available in the first and second service provider networks, as well as the same or comparable class definitions.

Functions of the authorization control server PCI can likewise relate to the monitoring of the status of the first or second terminal for the purposes of access control by parents. Functions of the authorization control server PCI may also be provided for checking and for updating the configuration and/or for setting the access control by parents in the second service provider network 299 via the first terminal G1 in the first service provider network 298. For example, the authorization control server PCI can receive output requests and/or updates of the configuration of the access control by parents from the first terminal G1 and can pass these to the second terminal G2, in response to which the second terminal G2 sends back the data required for the output request to the authorization control server PCI, or implements the received updates, thus resulting in checkable synchronization of the configuration of the access control by parents in the first service provider network 298 and in the second service provider network 299.

Use of a single authorization control server PCI is particularly worthwhile when the first service provider network 298 and the second service provider network 299 are associated with a single company or the same business unit of a company, for example a telecommunications company. In this case, the functionality and the availability of the authorization control server PCI are controlled in one place, thus allowing particularly simple implementation.

With an input 201 on the first terminal G1, a user of the first terminal G1 notifies the first service provider network 298 that he wishes to output the multimedia content C. In the form of a message 202, the first terminal G1 then provides the authorization control server PCI with a first request for the multimedia content C to be output via the first terminal G1.

The authorization control server PCI assesses the first request and determines that the multimedia content C is a classified content, whose output requires verification of appropriate authorization. The authorization control server PCI informs the first terminal G1 of this, with a message 203.

On the basis of the reception of the message 203, the first terminal G1 outputs an input request 204 for a personal identification number for the user of the first terminal G1.

The user of the first terminal G1 then enters his personal identification number PIN1 by an input 205 on the first terminal G1. The first terminal G1 makes the personal identification number PIN1 available to the authorization control server PCI in the form of a message 206. After receiving the message 206, the authorization control server PCI checks that the output of the multimedia content C according to the first request is authorized. To do this, the authorization control server PCI uses the personal identification number PIN1 to determine whether the user of the terminal G1 has access authorization to the class of classified multimedia contents which is associated with the multimedia content C. In the present example, this is the case, as a result of which the authorization control server PCI signals to the first terminal G1 in the form of a message 207 that an access authorization exists for the user of the first terminal G1 to the multimedia content C. The message 207 may additionally include access information for the multimedia content C, for example an address of a VoD server or a multicast address, from which the first terminal G1 should obtain the multimedia content C. The message 207 may also include decryption information for the situation in which the multimedia content C is obtained in encrypted form from said addresses. The message 207 can likewise contain information as to where the first terminal G1 can obtain or access the above data.

After receiving the message 207, the first terminal G1 is supplied with the access information required for access to the multimedia content C, if this information is not yet available, or is not completely available. If the multimedia content C is available immediately, for example as a Video on Demand or as a television program which is already running, then the first terminal G1 demands immediate access to the multimedia content C, in the form of a message 208. By way of example, this may be a request for the multimedia content C from a VoD server or an IGMP command for the first terminal G1 to enter a multicast group via which the multimedia content C is provided. This leads to the provision of the multimedia content C for the first terminal G1 in the form of a communication relationship 209, which may comprise provision by streaming, for example using the RTSP protocol, or any other provision in the form of loading with a suitable protocol such as UDP, TCP, RTP, FTP or a mixture of said types of provision.

With the availability of the multimedia content C, or of a part of it, in the terminal G1, the multimedia content C is output 210 via the first terminal G1.

If the multimedia content C desired in accordance with the first request is not yet available since, for example, it is a television program which will not be available for output until the next day, the first terminal G1 sets an appropriate timer and, when the timer times out, initiates the output 210 of the multimedia content C, by outputting the message 208, at the correct time when the multimedia content C is available.

With an input 211 on the first terminal G1, the user of the first terminal G1 informs the first service provider network 298 that he desires the current multimedia content C, or the multimedia content C which will be available in the future, to be output via the second terminal G2. The first terminal G1 then sends a second request for the multimedia content C, for the multimedia content C to be output on the second terminal G2, to the authorization control server PCI, in the form of a message 212. The authorization control server PCI informs the second terminal G2 of this in the form of a message 213. The second terminal G2 acknowledges the message 213 with a message 214 in which, for example, it is possible to communicate non-availability of the second terminal for outputting the multimedia content C, readiness to output the multimedia content C, status information relating to the second terminal G2 and/or a request to output a first security note on the first terminal G1.

After evaluation of the message 214, the authorization control server PCI informs the first terminal G1, in the form of a message 215, whether it is possible to output the multimedia content C via the second terminal G2 or whether a first security note must be output on the first terminal G1.

In the present case, the first terminal G1 uses the message 215 to inform that the multimedia content C can be output via the second terminal G2 and that, because of the state and the configuration of the second terminal G2, there is no need to output a first security note on the first terminal G1. The first terminal G1 then checks its configuration and finds that the user of the first terminal G1 has stipulated that a first security note must be produced on the basis of the second request, in order to reliably preclude incorrect operation.

The first terminal G1 then outputs the first security note in the form of an output 216. In particular, the output 216 may include the information that the multimedia content C can be output via the second terminal G2 and, furthermore, it may contain status information about the second terminal G2, as a function of the access authorization of the personal identification number of the user of the first terminal G1.

The user of the first terminal G1 produces a confirming acknowledgement of the first security note by an input 217 on the first terminal G1. This leads to the authorization control server PCI being informed by means of a message 218. On receiving the message 218, the authorization control server PCI informs the second terminal G2, by a message 219, that the output of the multimedia content C via the second terminal G2 is confirmed, and should take place.

On the basis of reception of the message 219, the second terminal G2 provides the access information required for access to the multimedia content C, if this is not yet available or is not completely available. If the multimedia content C is available immediately, for example as Video on Demand or as a television program which is already running, then the second terminal G2 demands immediate access to the multimedia content C, in the form of a message 220. By way of example, this may be a request for the multimedia content C from a VoD server or an IGMP command for the second terminal G2 to join a multicast group via which the multimedia content C is provided. This leads to the multimedia content C being provided for the second terminal G2 in the form of a communication relationship 221 which may comprise provision by streaming for example using the RTSP protocol or any other provision in the form of loading with a suitable protocol such as UDP, TCP, RTP, FTP or a mixture of said types of provision.

With the availability of the multimedia content C, or of a part of it, in the second terminal G2, the multimedia content C is output 222 via the second terminal G2.

If the multimedia content C desired in accordance with the first request is not yet available since, for example, it is a television program which will not be available for output until the next day, the second terminal G2 sets an appropriate timer and, when the timer times out, initiates the output 222 of the multimedia content C, by outputting the message 220, at the correct time when the multimedia content C is available.

The output of the multimedia content C via the first terminal G1, and the output of the multimedia content C via the second terminal G2, may require different codings. In addition, the output of the multimedia content C via the first terminal G1, and the output of the multimedia content C via the second terminal G2, may necessitate different availability addresses and encryptions. For example, in general, it cannot be assumed that the multimedia content C for the output via the first terminal G1 and the multimedia content C for the output via the second terminal G2 can be obtained, for example, from the same VoD server, or from the same multicast group.

Figure 3:
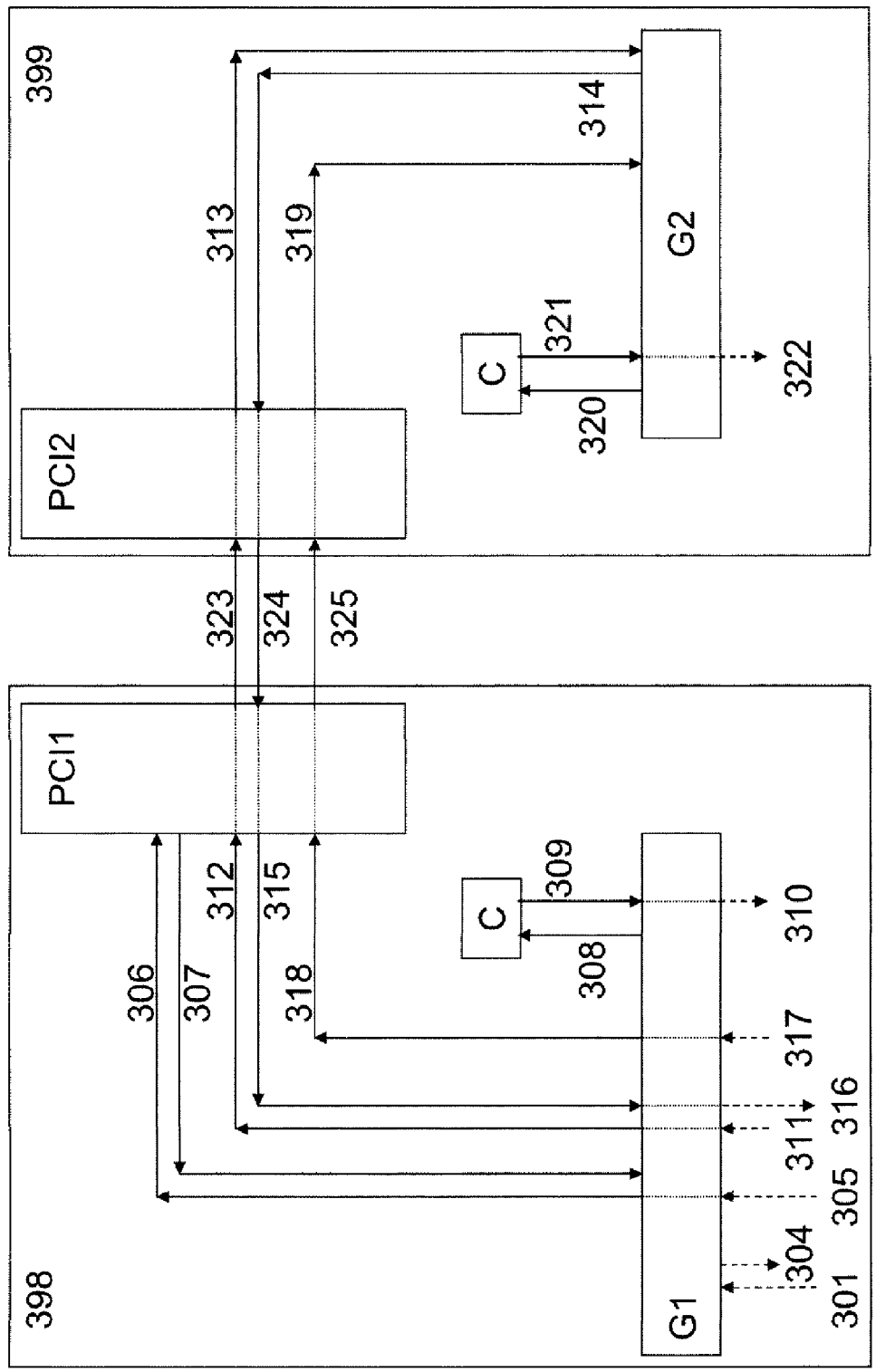
FIG. 3 shows an output of a multimedia content with the involvement of two authorization control servers.

FIG. 3 shows an output of a multimedia content C with two authorization control servers PCI1, PCI2 involved. A first authorization control server PCI1 is a central device in a first service provider network 398, which makes a first network solution for provision of multimedia contents available for a first terminal G1. A second authorization control server PCI2 is a central device in a second service provider network 399, which makes a second network solution for provision of multimedia contents available for a second terminal G2. The first authorization control server PCI1 and the second authorization control server PCI2 allow intercommunication between the first service provider network 398 and the second service provider network 399. In particular, the first authorization control server PCI1 and the second authorization control server PCI2 allow communication between the first terminal G1 and the second terminal G2. In order to communicate with the first authorization control server PCI1, the first terminal G1 has a client functionality for the first authorization control server PCI1, which can preferably be in the form of software. In order to communicate with the second authorization control server PCI2, the second terminal G2 has a client functionality for the second authorization control server PCI2, which can likewise preferably be in the form of software.

Use of the first and second authorization control servers is particularly worthwhile when the first service provider network 398 and the second service provider network 399 are not associated with a single company or are not associated with the same business unit of a company. This has the advantage that a neutral message interface can be created between the first and the second authorization control service, and matches to the first and second service provider networks can be carried out respectively in the first and the second authorization control server. In order to ensure that configuration data for access control by parents is always correctly synchronized, one of the two authorization control servers can be defined to be a designated authorization control server which in each case consistently updates the configuration data for the access control by parents as required or on demand, for example by an operator. This advantageously makes it possible to prevent an update of configuration data for the access control by parents in the second service provider network 399, initiated by the first service provider network 398, and an approximately simultaneous update of configuration data for access control by parents in the first service provider network 398, initiated by the second service provider network 399, leading to inconsistencies in the configuration data of the access control by parents and/or to access conflicts when accessing the configuration data relating to the access control by parents.

By an input 301 on the first terminal G1, a user of the first terminal G1 notifies the first service provider network 398 that he wishes to output the multimedia content C.

The first terminal G1 assesses the input 301 and determines that the multimedia content C is a classified content, whose output requires verification of appropriate authorization. The first terminal G1 then outputs an input request 304 for a personal identification number of the user of the first terminal G1.

The user of the first terminal G1 then enters his personal identification number PIN1 by an input 305 on the first terminal G1. The first terminal G1 sends a first request for the multimedia content C, for the multimedia content C to be output via the first terminal G1, in the form of a message 306 to the authorization control server PCI1. In this case, the message 306 comprises the personal identification number PIN1. After reception of the message 306, the authorization control server PCI1 then checks that the output of the multimedia content C in accordance with the first request is authorized. To do this, the authorization control server PCI uses the personal identification number PIN1 to determine whether the user of the terminal G1 has access authorization to the class of classified multimedia contents which is associated with the multimedia content C. This is the case in the present example, as a result of which the authorization control server PCI1 signals to the first terminal G1, in the form of a message 307, that access authorization exists for the user of the first terminal G1 to the multimedia content C. In addition, the message 307 may include access information for the multimedia content C, for example an address of a VoD server or a multicast address from which the first terminal G1 should obtain the multimedia content C. The message 307 may also include decryption information for the situation in which the multimedia content C is obtained in encrypted form from said addresses.

On the basis of the reception of the message 307, the first terminal G1 obtains the access information required for access to the multimedia content C, if this is not yet available, or is not completely available. Since, in the present example, the multimedia content C is available immediately, for example as Video on Demand or as a television program which is already running, the first terminal G1 demands immediate access to the multimedia content C, in the form of a message 308. By way of example, this may be a request for the multimedia content C from a VoD server, or an IGMP command for the first terminal G1 to enter a multicast group via which the multimedia content C is provided. This leads to the multimedia content C being provided for the first terminal G1 in the form of a communication relationship 309, which may include provision by streaming for example using the RTSP protocol or any other provision in the form of loading with a suitable protocol, such as UDP, TCP, RTP, FTP or a mixture of said types of provision.

When the multimedia content C, or a suitable part of it, is available in the first terminal G1, the multimedia content C is output 310 via the first terminal G1.

By an input 311 on the first terminal G1, the user of the first terminal G1 notifies the first service provider network 398 that he wishes to output the current multimedia content C as quickly as possible via the second terminal G2. The first terminal G1 then sends a second request for the multimedia content C, for the multimedia content C to be output via the second terminal G2, in the form of a message 312 to the authorization control server PCI1. The first authorization control server PCI1 informs the second authorization control server PCI2 of this in the form of a message 323. The second authorization control server PCI2 informs the second terminal G2 of this in the form of a message 313. The second terminal G2 acknowledges the message 313 with a message 314 in which, for example, non-availability of the second terminal G2 for outputting the multimedia content C, readiness to output the multimedia content C, a status information item relating to the second terminal G2, and/or a request to output a first security note to the first terminal G1 can be communicated.

After evaluation of the message 314, the second authorization control server PCI2 informs the first authorization control server PCI1 of this, in the form of a message 324. After evaluation of the message 324, the first authorization control server PCI1 informs the first terminal G1, in the form of a message 315, in particular as to whether it is possible to output the multimedia content C via the second terminal G2 and whether a first security note must be output to the first terminal G1.

In the present case, the message 315 informs the first terminal G1 that the multimedia content C can be output via the second terminal G2 and that a first security note must be output on the first terminal G1, on the basis of the state and the configuration of the second terminal G2.

In response to this, the first terminal G1 outputs the first security note in the form of an output 316. The output 316 may, in particular, include the information that the multimedia content C can be output via the second terminal G2 and, furthermore, it may contain status information about the second terminal G2, as a function of the access authorization of the personal identification number of the user of the first terminal G1.

The user of the first terminal G1 produces a confirming acknowledgement in response to the first security note, by an input 317 on the first terminal G1. This leads to the first authorization control server PCI1 being informed by means of a message 318. On reception of the message 318, the first authorization control server PCI1 informs the second authorization control server PCI2 of this by means of a message 325. On reception of the message 325, the second authorization control server PCI2 informs the second terminal G2, via a message 319, that the output of the multimedia content C via the second terminal G2 is confirmed, and should take place.

On the basis of reception of the message 319, the second terminal G2 obtains the access information required for access to the multimedia content C, if this is not yet available or is not completely available. Since the multimedia content C is available immediately and, on the basis of the second request, the start of the output via the second terminal G2 is desired as quickly as possible, the second terminal G2 demands immediate access to the multimedia content C, in the form of a message 320. By way of example, this may be a request for the multimedia content C from a VoD server, a PVR server, a TV headend for feeding television programs into the second service provider network 399, or an IGMP command for the second terminal G2 to enter a multicast group via which the multimedia content C is provided. This leads to the multimedia content C being provided for the second terminal G2 in the form of a communication relationship 321, which may include provision by streaming, for example using the RTSP protocol or any other provision in the form of loading with a suitable protocol, such as UDP, TCP, RTP, FTP or a mixture of said types of provision.

When the multimedia content C, or a part of it, is available in the second terminal G2, the multimedia content C is output 322 via the second terminal G2.

If the multimedia content C is a Video on Demand, then the second request, in the form of the message 312, may include time information which defines that part of the Video on Demand which has already been viewed via the first terminal G1. This time information may be transmitted in the form of the messages 323 and 313 to the second terminal G2, which can provide the time information as part of the message 320. This results in the Video on Demand being provided from a relative time, as defined by the time information, by means of the communication relationship 321, as a result of which the Video on Demand is output via the second terminal G2 from that point at which the second request was produced via the first terminal G1. The Video on Demand is therefore not output from the start, but continues to be output via the second terminal G2 from the point of the request.

Figure 4:
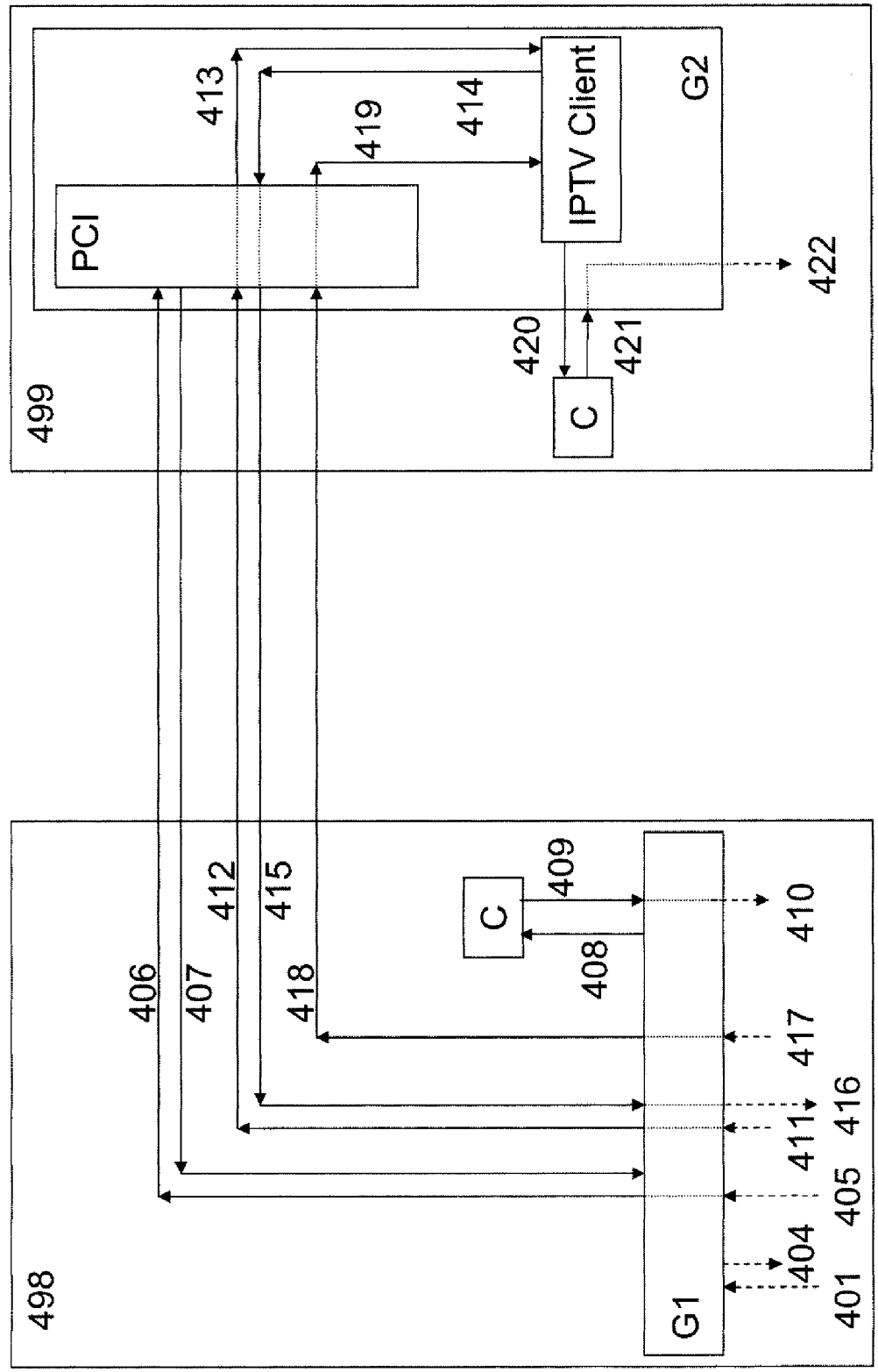
FIG. 4 shows an output of a multimedia content with the involvement of a decentralized authorization control server.

FIG. 4 shows an output of a multimedia content C with the involvement of a decentralized authorization control server PCI. In this case, the authorization control server PCI is a decentralized function of one of the terminals of a family or user group. It allows intercommunication for a first terminal G1 in a first service provider network 498, which provides a first network solution for provision of multimedia contents for the first terminal G1, and of a second terminal G2 of a second service provider network 499, which provides a second network solution for provision of multimedia contents for the second terminal G2. The first terminal G1 and the second terminal G2 each have a client functionality, which can preferably be in the form of software, for communication with the authorization control server PCI. The authorization control server PCI can advantageously be embodied on a sufficiently powerful set-top box of the second service provider network 499, with the authorization control server PCI acting only for the terminals of one family or user group. This results in the advantage that there is no need for a central authorization control server.

Functions of the authorization control server PCI may relate to support for management, covering the first and the second service provider network, of access rights for access control by parents to multimedia contents, and access authorization information for a family or user group. For example, this allows the availability of the same authorization information items for the family or user group in the first and in the second service provider networks.

By an input 401 on the first terminal G1, a user of the first terminal G1 notifies the first service provider network 498 that he wishes to output the multimedia content C.

The first terminal G1 assesses the input 401 and determines that the multimedia content C is a classified content, whose output requires verification of appropriate authorization. The first terminal G1 therefore outputs an input request 404 for a personal identification number of the user of the first terminal G1. The user of the first terminal G1 then enters his personal identification number PIN1, by an input 405 on the first terminal G1.

The first terminal G1 then provides a first request for the multimedia content C, for the multimedia content C to be output via the first terminal G1, in the form of a message 406 to the authorization control server PCI. The message 406 includes the personal identification number PIN1.

After reception of the message 406, the authorization control server PCI checks that the output of the multimedia content C in accordance with the first request is authorized. For this purpose, the authorization control server PCI uses the personal identification number PIN1 to determine whether the user of the terminal G1 has access authorization for the class of classified multimedia contents which is associated with the multimedia content C. This is the case in the present example, as a result of which the authorization control server PCI signals to the first terminal G1, in the form of a message 407, that access authorization exists for the user of the first terminal G1 to the multimedia content C. In addition, the message 407 may include access information for the multimedia content C, for example an address of a VoD server or a multicast address, from which the first terminal G1 can obtain the multimedia content C.

On the basis of reception of the message 407, the first terminal G1 obtains the access information required for access to the multimedia content C, if this is not already available or is not completely available. In the present case, the multimedia content C is available immediately as a television program which is already running. The first terminal G1 therefore demands immediate access to the multimedia content C, in the form of a message 408. By way of example, this may be an IGMP command for the first terminal G1 to join a multicast group for which the multimedia content C is provided. This leads to the multimedia content C being provided for the first terminal G1 in the form of the communication relationship 409 which, for example, may include provision by streaming using the RTSP protocol.

When the multimedia content C, or a sufficient part of it, is available in the first terminal G1, the multimedia content C is output 410 via the first terminal G1.

By an input 411 on the first terminal G1, the user of the first terminal G1 notifies the first service provider network 498 that he wishes to output the current multimedia content C via the second terminal G2 at a later point in time T. The first terminal G1 then makes a second request for the multimedia content C, for the multimedia content C to be output via the second terminal G2 from the point in time T, in the form of a message 412 to the authorization control server PCI. The authorization control server PCI, which is implemented on the second terminal G2, informs an IPTV client of the second terminal G2 of this in the form of a message 413. The IPTV client of the second terminal G2 acknowledges the message 413 with a message 414 in which it is possible to communicate readiness to output the multimedia content C at the point in time T, status information relating to the second terminal G2 and/or a request to output a first security note on the first terminal G1.

After evaluation of the message 414, the authorization control server PCI informs the first terminal G1, in the form of a message 415, that the multimedia content C can be output via the second terminal G2 at the point in time T, and that, on the basis of the state and the configuration of the second terminal G2, there is no need to output the first security note on the first terminal G1.

The first terminal G1 then checks its configuration and finds that the user of the first terminal G1 has stipulated that it should receive an essential first security note on the basis of the second request, in order to reliably preclude incorrect operation.

In response to this, the first terminal G1 outputs the first security note, in the form of an output 416. In particular, the output 416 may include an information item that the multimedia content C can be output via the second terminal.

By an input 417 on the first terminal G1, the user of the first terminal G1 passes a confirming acknowledgement in response to the first security note. This leads to the authorization control server PCI being informed of this by means of a message 418. On reception of the message 418, the authorization control server PCI informs the IPTV client of the second terminal G2, via a message 419, that the output of the multimedia content C via the second terminal G2 is confirmed, and should take place.

On the basis of the reception of the message 419, the second terminal G2 obtains the access information required for access to the multimedia content C, if this is not yet available or is not completely available. Since the point in time T has not yet been reached, the IPTV client of the second terminal G2 sets an appropriate timer, and initiates an output 422 of the multimedia content C, by provision of a message 420, when the timer times out.

The IPTV client of the second terminal G2 demands immediate access to the multimedia content C, in the form of the message 420. By way of example, this may be an IGMP command for the second terminal G2 to join a multicast group via which the multimedia content C is provided. This leads to the multimedia content C being provided for the second terminal G2 in the form of a communication relationship 421, which may include provision by streaming, for example using the RTSP protocol.

Figure 5:
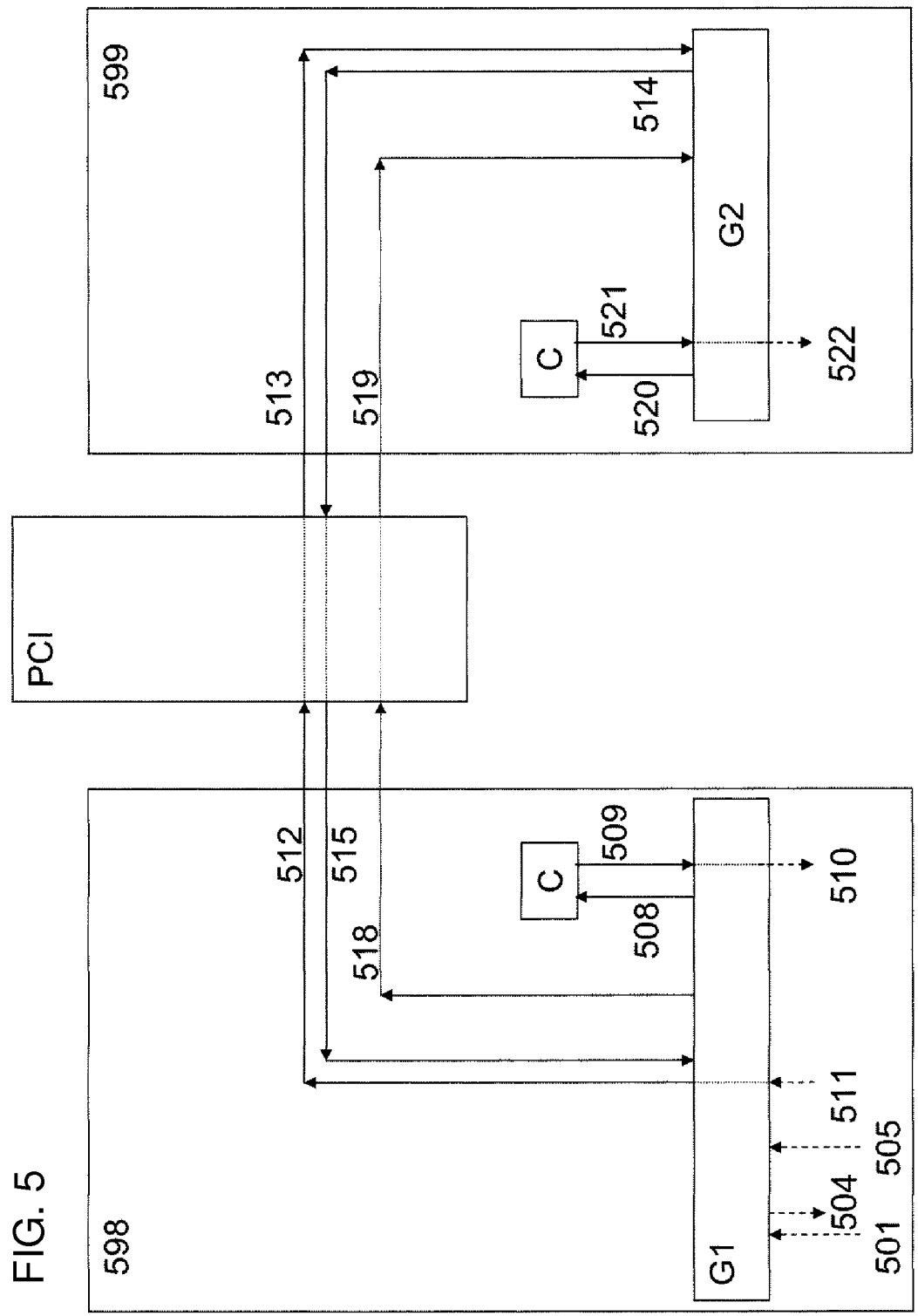
FIG. 5 shows an output of a multimedia content after local checking of an access authorization.

FIG. 5 shows a multimedia content C output after local checking of access authorization. In this case, an authorization control server PCI is a central device and allows intercommunication of a first service provider network 598, which provides a first network solution for provision of multimedia contents for a first terminal G1, and a second service provider network 599, which provides a second network solution for provision of multimedia contents for a second terminal G2. In particular, the authorization control server PCI allows communication between the first terminal G1 and the second terminal G2.

By an input 501 on the first terminal G1, a user of the first terminal G1 notifies the first service provider network 598 that he wishes to output the multimedia content C.

The first terminal G1 assesses the input 501 and determines that the multimedia content C is a classified content, whose output requires verification of appropriate authorization. The first terminal G1 therefore outputs an input request 504 for a personal identification number of the user of the first terminal G1.

By an input 505 on the first terminal G1, the user of the first terminal G1 then enters his personal identification number PIN1. The first terminal G1 in this case checks that the output of the multimedia content C in accordance with the input 501 is authorized. To do this, the first terminal G1 uses the personal identification number PIN1 to determine whether the user of the terminal G1 has access authorization to the class of classified multimedia contents which is associated with the multimedia content C. In the present example, this is the case, in response to which the first terminal G1 obtains the access information required for access to the multimedia content C, if this is not yet available or is not completely available.

The first terminal G1 provides a first request for the multimedia content C, for the multimedia content C to be output via the first terminal, in the form of a message 508. By way of example, the message 508 can be a request for the multimedia content C from a VoD server, or an IGMP command for the first terminal G1 to join a multicast group via which the multimedia content C is provided. This leads to the multimedia content C being provided for the first terminal G1 in the form of a communication relationship 509, which may include provision by streaming, for example using the RTSP protocol.

With the availability of the multimedia content C, or of a part of it, in the terminal G1, the multimedia content C is output 510 via the first terminal G1.

By an input 511 on the first terminal G1, the user of the first terminal G1 notifies the first service provider network 598 that he wishes to output the current multimedia content C via the second terminal G2. The first terminal G1 then produces a second request for the multimedia content C, for the multimedia content C to be output via the second terminal G2, in the form of a message 512 to the authorization control server PCI. The authorization control server PCI informs the second terminal G2 of this in the form of a message 513. The second terminal G2 acknowledges the message 513 with a message 514 in which, for example, readiness to output the multimedia content C and/or a status information item relating to the second terminal G2 can be communicated.

After evaluation of the message 514, the authorization control server PCI informs the first terminal G1, in the form of a message 515, that the multimedia content C can be output via the second terminal G2 and that there is no need to output a first security note on the first terminal G1, on the basis of the state and the configuration of the second terminal G2. The first terminal G1 then checks its configuration and confirms that the user of the first terminal G1 has not stipulated that an essential first security note must be obtained on the basis of the second request.

The first terminal G1 then does not output a first security note, and acknowledges the message 515 with a message 518.

On reception of the message 518, the authorization control server PCI informs the second terminal G2 by means of a message 519 that the output of the multimedia content C via the second terminal G2 is confirmed, and should take place.

On the basis of the reception of the message 519, the second terminal G2 obtains the access information required for access to the multimedia content C, if this is not yet available or is not completely available. Since the multimedia content C in the present example is available immediately, the second terminal G2 demands immediate access to the multimedia content C, in the form of a message 520. By way of example, this may be a request for the multimedia content C from a VoD server, or an IGMP command for the second terminal G2 to join a multicast group via which the multimedia content C is provided. This leads to the multimedia content C being provided for the second terminal G2 in the form of a communication relationship 521, which may include provision by streaming, for example using the RTSP protocol.

With the availability of the multimedia content C or of a part of it which is sufficient for an output, in the second terminal G2, the multimedia content C is output via the second terminal G2.

Figure 6:
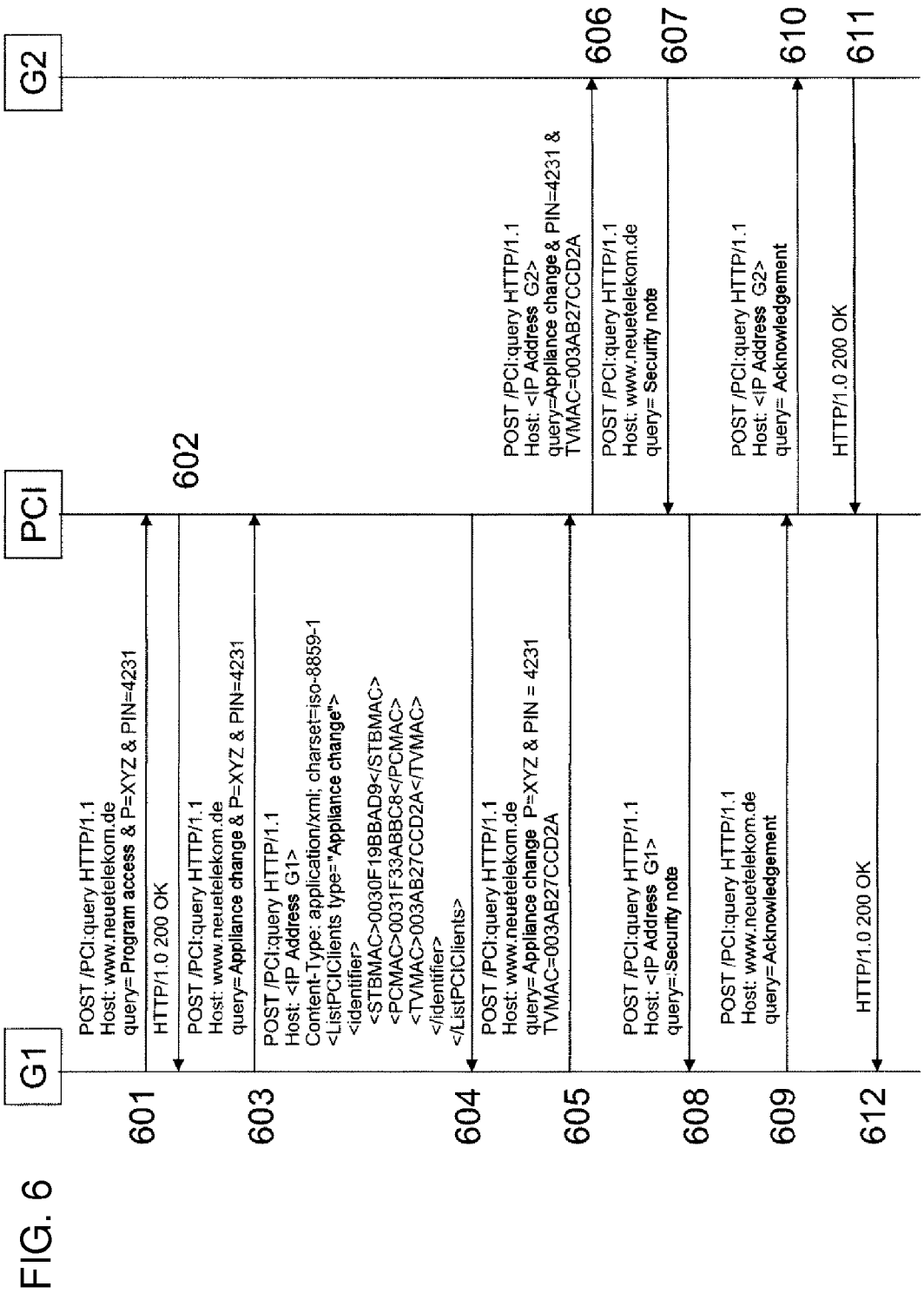
FIG. 6 shows a message flow, based on the HTTP protocol, for a change to an output of a classified multimedia content from a first terminal to a second terminal.

FIG. 6 shows a message flow, based on the HTTP protocol, for a change of an output of a classified multimedia content C from a first terminal G1 to a second terminal G2. The first terminal G1 uses a first protocol message 601 to make a first request to an authorization control server PCI for program access to the program XYZ. The protocol message already includes an authorization information item PIN. After checking that the output of the program XYZ is authorized, the authorization control server PCI sends a positive acknowledgement to the first terminal G1 by means of a protocol message 602. In response to this, the program XYZ is output via the first terminal G1. While the program XYZ is being output via the first terminal G1, the first terminal G1 makes a second request available to the authorization control server PCI, for the program XYZ to be output via a different terminal, by means of a protocol message 603. The protocol message 603 includes the information that the output change for the program XYZ is desired, and it optionally includes the first authorization information item PIN, but it does not contain any information relating to the second terminal G2, via which the further output of the program XYZ is requested. After evaluation of the protocol message 603, the authorization control server PCI responds with a protocol message 604, which contains a list of available second terminals which can be identified using their MAC addresses and for which an output of the program XYZ may be requested. In response to this, a list of the available second terminals is output for selection purposes to the user of the first terminal G1. The user of the first terminal G1 selects from this list the home television, which is identified by the MAC address TVMAC. The selection of the second terminal G2 is made available to the authorization control server PCI by means of a protocol message 605. The protocol message 605 contains the information that the output change is desired for the program XYZ, the first authorization information item PIN as well as, in particular, the MAC address TVMAC of the television intended for the output. The authorization control server PCI passes on this information in the form of a protocol message 606 to the second terminal G2, once it has determined the IP address of the second terminal G2. The second terminal G2 responds to the output request 606 with the request for an output of a first security note via the first terminal G1, with the aid of a protocol message 607, which makes the second terminal G2 available to the authorization control server PCI. On reception of the protocol message 607, the authorization control server PCI makes a request for the first security note to be output to the first terminal G1, in the form of a protocol message 608. After reception of the protocol message 608, the first terminal G1 outputs the first security note, together with an input request for a confirming acknowledgement. In response to this, the user of the first terminal G1 enters the confirming acknowledgement, for example by pushing an OK button on the first terminal G1. The first terminal G1 informs the authorization control server PCI of this with the aid of a protocol message 609. On reception of the protocol message 609, the authorization control server PCI informs the second terminal G2 of the presence of the confirming acknowledgment, with the aid of a protocol message 610. The second terminal G2 then carries out steps which are necessary to output the program XYZ, and acknowledges successful implementation positively, with a protocol message 611, to the authorization control server PCI. On reception of the protocol message 611, the authorization control server PCI informs the first terminal G1 that the program XYZ has been output successfully via the second terminal G2, by means of a protocol message 612.

Figure 7:
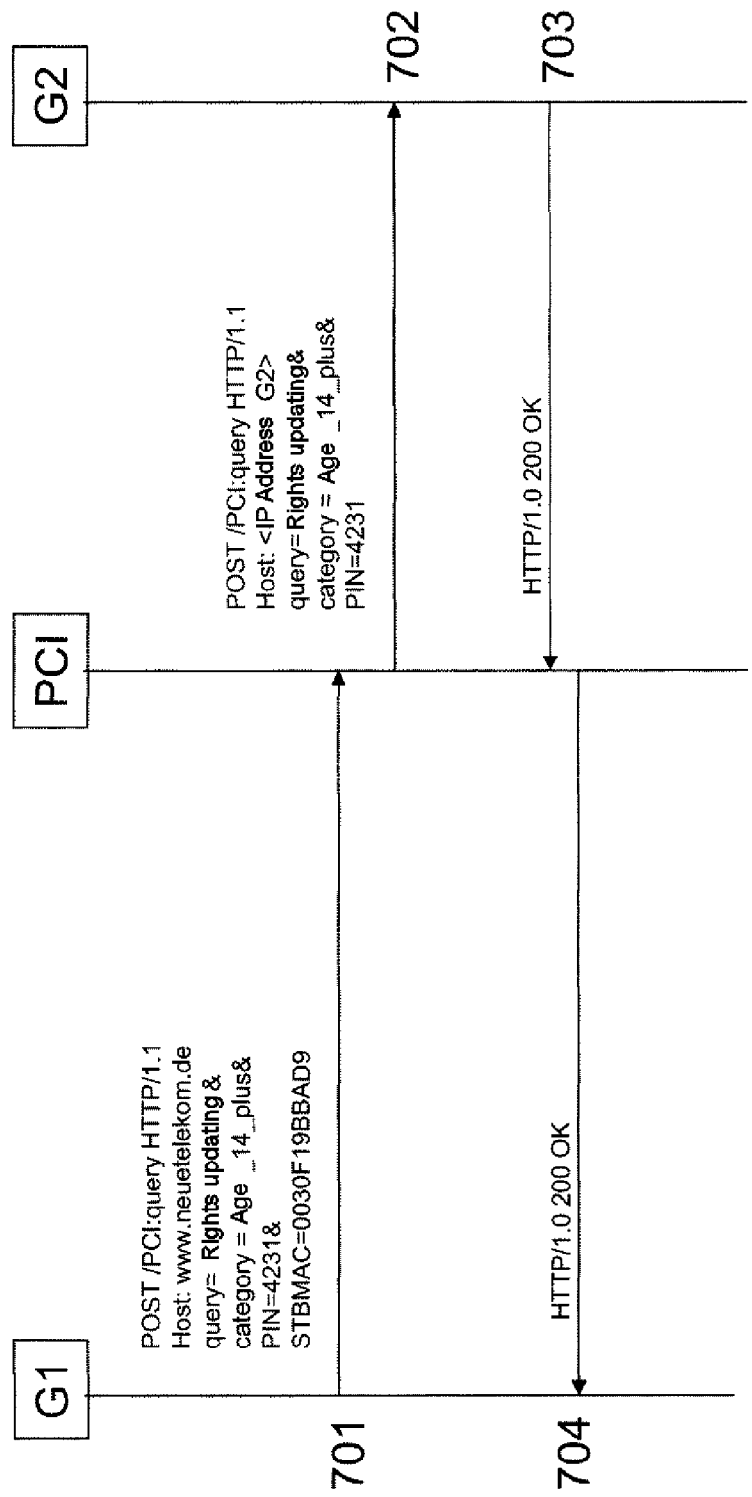
FIG. 7 shows a message flow, based on the HTTP protocol, for updating of access rights via an authorization control server.

FIG. 7 shows a message flow, based on the HTTP protocol, for updating access rights via an authorization control server PCI. Access rights can be updated only if an authorization has been provided to do so. This is the case, in particular, when a master authorization information item has been entered, for example via a first terminal G1. After an appropriate input by the user of the first terminal G1, the first terminal G1 uses a protocol message 701 to make a request to the authorization control server PCI to update the access rights which are linked to a personal identification number PIN. The protocol message includes a category information item, a personal identification number PIN and an MAC address of a second terminal G2. On reception of the protocol message 701, the authorization control server PCI determines the IP address of the second terminal G2, optionally locally stores the content of the protocol message 701, and sends the second terminal G2 a protocol message 702, which informs the second terminal G2 that access rights need to be updated. On reception of the protocol message 702, the second terminal G2 ensures that the personal identification number "4231" can be used in future to access classified multimedia content whose output requires a minimum age of 14 years. The second terminal G2 uses a protocol message 703 to positively acknowledge to the authorization control server PCI that the request received with the protocol message 702 has been implemented. On reception of the protocol message 703, the authorization control server PCI positively acknowledges the implementation of the request made with the protocol message 701, to the first terminal G1, by means of a protocol message 704. The first terminal G1 can use the reception of the protocol message 704 to output a completion message.

Figure 8:
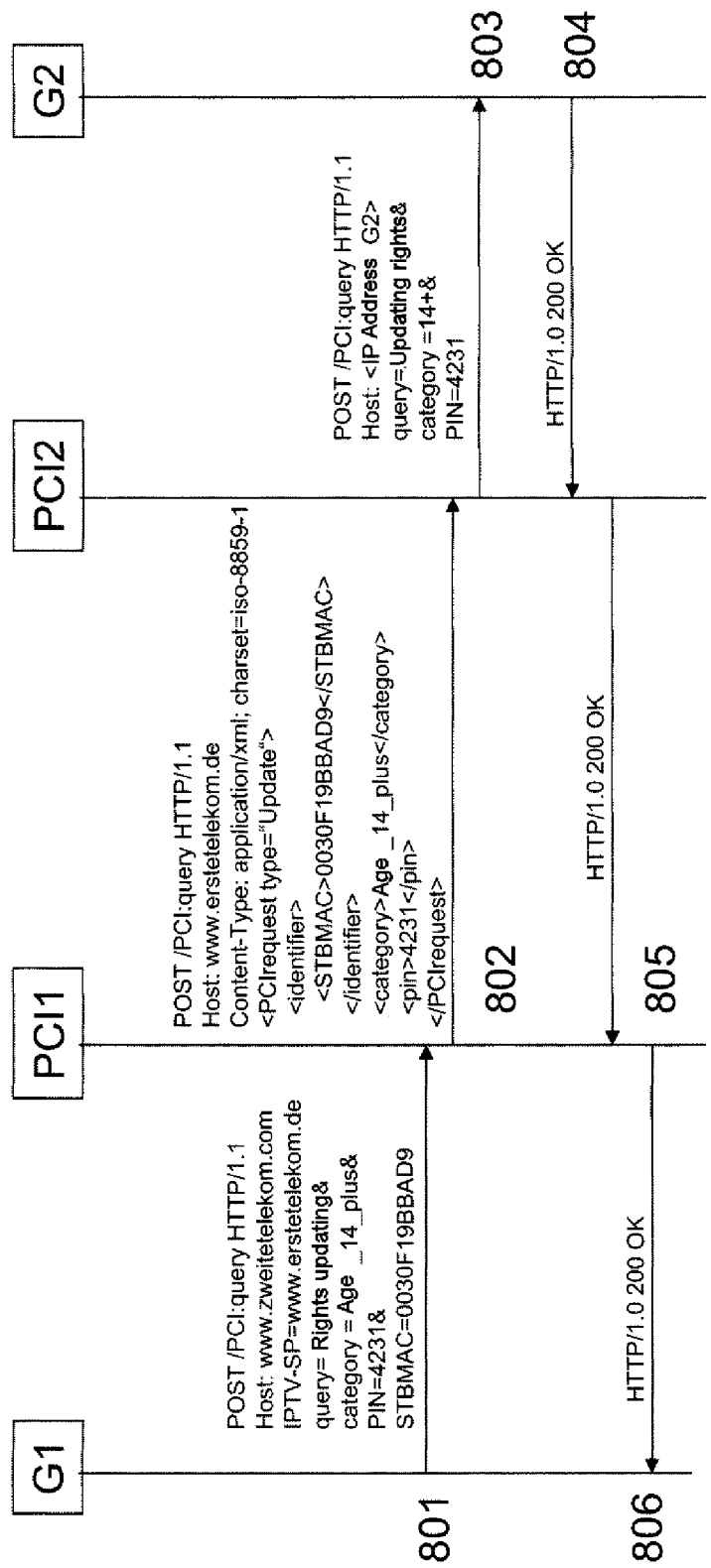
FIG. 8 shows a message flow, based on the HTTP protocol, for updating of access rights via two authorization control servers.

FIG. 8 shows a message flow, based on the HTTP protocol, for updating access rights via two authorization control servers PCI1, PCI2. Access rights can be updated only when an authorization is available to do so. This is the case in particular when a master authorization information item has been entered, for example, via a first terminal G1. After an appropriate input by the user of the first terminal G1, the first terminal G1 uses a protocol message 801 to send to the first authorization control server PCI1 a request to update the access rights linked to a personal identification number PIN. The protocol message includes a category information item, a PIN and an MAC address of a second terminal G2, and furthermore in particular an address information item for a second service provider network IPTV. On reception of the protocol message 801, the first authorization control server PCI1 determines that the second service provider network IPTV should be informed via HTTP using an XML dialect, and translates the content of the protocol message 801 to this XML dialect, stores the content of the protocol message 801, and/or optionally locally the transformation based on XML, and sends to the second authorization control server PCI2 the information transformed into XML, in the form of a protocol message 802. Since the second service provider network IPTV does not use the XML format internally, the second authorization control server PCI2 translates the protocol message 802 to an HTTP protocol message 803, which is used in the second service provider network IPTV and informs the second terminal G2 that the access rights need to be updated. Once the second authorization control server PCI2 has determined the IP address of the second terminal, it sends the protocol message 803 to the second terminal G2. On reception of the protocol message 803, the second terminal G2 arranges that, in future, classified multimedia content whose output requires a minimum age of 14 years can be accessed using the personal identification number "4231". The second terminal G2 positively acknowledges the implementation of the request received with the protocol message 803 to the second authorization control server PCI2, by means of a protocol message 804. On reception of the protocol message 804, the second authorization control server PCI2 positively acknowledges the implementation of the request according to the protocol message 802, to the first authorization control server, by means of a protocol message 805. On reception of the protocol message 805, the first authorization control server PCI2 positively acknowledges the implementation of the request made with the protocol message 801 to the first terminal G1, by a protocol message 806. The first terminal G1 can use the reception of the protocol message 806 to output a message that the access rights have been successfully updated.

If a multimedia content is output via the second terminal G2 at the point in time when the access rights are being updated, then the second terminal G2 can immediately check the authorization of the output, in order to check that the access rights have been updated. If, for example, a multimedia content is being output which requires a minimum age of 14 years, and no personal identification number has yet been entered, then the output can be terminated and/or a request can be produced to enter a personal identification number, for example by controlling the second terminal G2.

FIG. 9 shows a message flow, based on the HTTP protocol, for a status check via an authorization control server PCI. A client function of the authorization control server PCI on a first terminal G1, for example a mobile telephone, can be implemented as an HTML browser. A user of the first terminal G1 can make inputs which, for example, identify a second terminal G2, by means of HTTP input masks. An identification such as this may, for example, be an MAC address, a telephone number in a landline network, or a symbolic name which uniquely identifies the second terminal G1. An identification information item for the second terminal G2, for example an STB of a family, can be entered if required via the first terminal G1 or else, for example, can be stored or kept available in the first terminal G1 in order to allow simple repeated input.

If the user of the first terminal G1 desires information relating to what multimedia contents have been accessed and/or output via the second terminal G2, or are currently being output, then he calls a checking function, which is provided for this purpose, of the client function, and, for example, sends thereto the MAC address of the second terminal G2 via the input function of the first terminal G1, possibly using local storage of the MAC address of the second terminal G2 in the first terminal G1 and, in particular, the verification of his authorization to use the checking function, in the form of a master authorization information item or master PIN of the user of the first terminal G1. After checking the input data and the authorization of the user of the first terminal G1, the checking function of the client function causes the first terminal G1 to send a protocol message 901 to the authorization control server PCI. The protocol message 901 contains address information of the authorization control server PCI, the MAC address of the second terminal G2 and the information that a status request should be carried out for the second terminal G2. On reception of the protocol message 901, the authorization control server PCI determines the IP address of the second terminal G2, and informs the second terminal G2 that a status request exists, using a protocol message 902.

On reception of the protocol message 902, the second terminal G2 determines, for example, the programs which have been output in the immediate past, with program names, channel names and access time intervals, and sends this information to the authorization control server PCI in the form of a protocol message 903. In the present example, the protocol message 903 states that the television program program name_y was output via the second terminal G2 via the television program channel_x between 1900 hrs and 1930 hrs. The authorization control server PCI passes this information on in the form of a protocol message 904 with the same content to the first terminal G1. As a result of the reception of the protocol message 904, the first terminal G1 outputs to the user of the first terminal G1 the information received on the basis of the status request, in a suitable form.

Alternatively or additionally, the protocol messages 901-904 can be implemented using XML. In a corresponding manner, a status request can also be made for a time period predetermined by the user of the first terminal G1. In addition, a cyclic output, which takes place on a fixed time pattern, for example every 5 minutes, for example of the multimedia content currently being accessed on the second terminal G2, can be provided in this way. A status request can likewise be made, with information of the user of the first terminal G1 in the event of a program change, on the second terminal G2. It is also possible for the first terminal G1 to use information obtained on the basis of the protocol message 904 to cause a program indicated in the protocol message 904 to be output via the first terminal G1. If the user of the first terminal G1, in particular a parent, finds that, for example, a current output of a multimedia content via the second terminal G2 which the children are using is undesirable, then he can suppress this output, using means already described for updating access rights, and, if required, can immediately terminate the output of the multimedia content via the second terminal G2.

FIG. 10 shows a message flow, based on the HTTP protocol, for a status check via two authorization control servers PCI1, PCI2. A client function of the first authorization control server PCI1 on a first terminal G1, for example a mobile telephone, may be implemented as an HTML browser. A user of the first terminal G1 can make inputs which identify a second terminal G2, using HTTP input masks. An identification such as this may, for example, be an MAC address. An identification information item for the second terminal G2, for example an STB of a family, can be input if required via the first terminal G1, or else can be stored in the first terminal G1, in order to allow simple repeated input.

If the user of the first terminal G1 desires information relating to what multimedia contents have been accessed and/or output via the second terminal G2, and/or are currently being output, then he calls a checking function, which is provided for this purpose, of the client function, and, for example, sends thereto the MAC address of the second terminal G2 via the input function of the first terminal, possibly using local storage of the MAC address of the second terminal G2 in the first terminal G1 and, in particular, the verification of his authorization to use the checking function, in the form of a master authorization information item of the user of the first terminal G1. After checking the input data and the authorization of the user of the first terminal G1, the checking function of the client function causes the first terminal G1 to send a protocol message 1001 to the first authorization control server PCI1. The protocol message 1001 comprises the MAC address of the second terminal G2, and furthermore in particular an address information item of a second service provider network IPTV.

On reception of the protocol message 1001, the first authorization control server PCI1 determines that the second service provider network IPTV should be informed via HTTP using an XML dialect, and translates the content of the protocol message 1001 to this XML dialect, stores the content of the protocol message 1001 and/or optionally locally stores the transformation to XML, and sends to the second authorization control server PCI2 the information transformed to XML, in the form of a protocol message 1002. Since the second service provider network IPTV does not use the XML format internally, the second authorization control server PCI2 translates the protocol message 1002 to an HTTP protocol message 1003, which is used in the second service provider network IPTV and informs the second terminal G2 that a status request for the second terminal G2 must be answered. Once the second authorization control server PCI2 has determined the IP address of the second terminal G2, it sends the protocol message 1003 to the second terminal G2.

On reception of the protocol message 1003, the second terminal G2 determines, for example, the programs that have been output in the immediate past, with program names, channel names and access time intervals, and sends this information to the second authorization control server PCI2 in the form of a protocol message 1004. In the present example, the protocol message 1004 states that the television program program name_y was output via the television program channel_x between 1900 hrs and 1930 hrs via the second terminal G2.

On reception of the protocol message 1004, the second authorization control server PCI2 translates the content of the protocol message 1004 to XML, and sends the translation to the first authorization control server PCI1 by means of a protocol message 1005. Since the first terminal G1 does not use the XML format of the protocol message 1005, the first authorization control server PCI1 translates the protocol message 1005 to a protocol message 1006, which is suitable for the first terminal G1 and has the same content, and sends this to the first terminal G1.

On the basis of the reception of the protocol message 1006, the first terminal G1 outputs the information obtained on the basis of the status request, to the user of the first terminal G1, in a suitable form.

The invention claimed is:

1. A method of enabling authorization-dependent access to multimedia contents, the method which comprises:
at a first terminal, providing a first request to at least one authorization control server for a multimedia content for an output of the multimedia content via the first terminal;
with the at least one authorization control server, using a first authorization information item to check whether or not the output of the multimedia content is authorized;
at the first terminal, providing a second request to the at least one authorization control server for an output of the multimedia content via a second terminal;
with the at least one authorization control server, checking whether or not a first security note is to be output via the first terminal; and
outputting the multimedia content via the second terminal if the first security note is not to be output on the first terminal, or if an input of a confirming acknowledgement for the first security note is identified by the first terminal.

2. The method according to claim 1, wherein the first authorization information item is a master authorization information item or an input of a further authorization information item is identified by the first terminal, wherein the further authorization information item is a master authorization information item.

3. The method according to claim 1, which comprises outputting a second status information item via the first terminal, the second status information item relating to the second terminal.

4. The method according to claim 1, which comprises making a further request to the at least one authorization server with the first terminal for updating of rights linked to a third authorization information item and/or of the third authorization information item, wherein the third authorization information item authorizes an output of a second further multimedia content via the second terminal.

5. The method according to claim 1, which comprises outputting the multimedia content via the first terminal immediately, or booking an output of the multimedia content.

6. The method according to claim 1, which comprises outputting a second security note via the second terminal if the second terminal is in operation at a point in time of a start of the output of the multimedia content via the second terminal.

7. The method according to claim 1, which comprises requesting the output of the multimedia content via the second terminal immediately with availability of the multimedia content or for a predetermined point in time.

8. The method according to claim 1, which comprises switching the second terminal to an active operating state if the second terminal is in an inactive operating state prior to a start of the output of the multimedia content via the second terminal.

9. The method according to claim 1, which comprises continuing to output the multimedia content via the first terminal after a point in time of a start of the output of the multimedia content via the second terminal.

10. The method according to claim 1, wherein the first terminal and the second terminal are associated with one another.

11. The method according to claim 1, wherein:
the first terminal is associated with a first service provider network and is identified with the aid of a first identification information item;
the second terminal is associated with a second service provider network and is identified with the aid of a second identification information item; and
the first terminal and the second terminal are associated with one another by association of the second identification information item with the first terminal.

12. The method according to claim 1, which comprises with the second terminal, identifying no input of a second authorization information item; and outputting the first security note via the first terminal, wherein the second authorization information item authorizes the output of the multimedia content.

13. The method according to claim 1, which comprises passing communication between the first terminal and the second terminal through the at least one authorization control server.

14. An apparatus for authorization-dependent access to multimedia contents, comprising a processor and a non-transitory memory having a set of instructions stored thereon to carry out, when executed by the processor, a method comprising:
at a first terminal, providing a first request to at least one authorization control server for a multimedia content for an output of the multimedia content via the first terminal;
with the at least one authorization control server, using a first authorization information item to check whether or not the output of the multimedia content is authorized;
at the first terminal, providing a second request to the at least one authorization control server for an output of the multimedia content via a second terminal;
with the at least one authorization control server, checking whether or not a first security note is to be output via the first terminal; and
outputting the multimedia content via the second terminal if the first security note is not to be output on the first terminal, or if an input of a confirming acknowledgement for the first security note is identified by the first terminal.

15. An apparatus for authorization-dependent access to multimedia contents, comprising an at least partially hardwired circuit configuration capable of carrying out a method including:
at a first terminal, providing a first request to at least one authorization control server for a multimedia content for an output of the multimedia content via the first terminal;
with the at least one authorization control server, using a first authorization information item to check whether or not the output of the multimedia content is authorized;
at the first terminal, providing a second request to the at least one authorization control server for an output of the multimedia content via a second terminal;
with the at least one authorization control server, checking whether or not a first security note is to be output via the first terminal; and
outputting the multimedia content via the second terminal if the first security note is not to be output on the first terminal, or if an input of a confirming acknowledgement for the first security note is identified by the first terminal.

* * * * *